(12) United States Patent  
Tanaka et al.

(10) Patent No.: US 8,431,259 B2  
(45) Date of Patent: Apr. 30, 2013

(54) COPOLYMERIZED AROMATIC POLYESTER, BIAXIALLY ORIENTED POLYESTER FILM, AND MAGNETIC RECORDING MEDIUM

(75) Inventors: Yoshitaka Tanaka, Gifu (JP); Toshio Ishidera, Ehime (JP); Tatsuya Ogawa, Ehime (JP); Hiromichi Ito, Ehime (JP)

(73) Assignee: Teijin Limited, Osaka-shi, Osaka (JP)

( * ) Notice: Subject to any disclaimer, the term of this patent is extended or adjusted under 35 U.S.C. 154(b) by 28 days.

(21) Appl. No.: 12/958,599

(22) Filed: Dec. 2, 2010

(65) Prior Publication Data

US 2011/0135965 A1 Jun. 9, 2011

(30) Foreign Application Priority Data

Dec. 3, 2009 (JP) ................. 2009-275606  
Jan. 28, 2010 (JP) ................. 2010-017091  
Jan. 28, 2010 (JP) ................. 2010-017092  
Sep. 17, 2010 (JP) ................. 2010-209290  
Sep. 17, 2010 (JP) ................. 2010-209291  
Sep. 17, 2010 (JP) ................. 2010-209292

(51) Int. Cl.  
*G11B 5/73* (2006.01)  
*G11B 5/66* (2006.01)  
*C08G 63/00* (2006.01)

(52) U.S. Cl.  
USPC ............. 428/847.3; 428/847.2; 428/474.4; 428/483; 360/134; 525/177

(58) Field of Classification Search ......... 428/474.4, 428/846.4, 846.2, 800, 847.7, 847.5, 411, 428/412, 846, 846.1, 482, 847.2, 847.3, 838, 428/475.2, 483, 480; 524/167, 604, 493; 525/177, 446, 298; 528/209, 176, 271, 272, 528/198, 194, 193; 360/134  
See application file for complete search history.

(56) References Cited

U.S. PATENT DOCUMENTS

| | | | |
|---|---|---|---|
| 3,901,851 A | 8/1975 | Kohno et al. | |
| 2005/0249961 A1* | 11/2005 | Saitoh et al. | 428/474.4 |
| 2006/0110628 A1* | 5/2006 | Ono et al. | 428/847.7 |
| 2007/0100038 A1* | 5/2007 | Glasgow et al. | 524/167 |
| 2009/0297888 A1* | 12/2009 | Horie et al. | 428/846.4 |
| 2010/0016539 A1* | 1/2010 | Kohno et al. | 528/209 |
| 2010/0120967 A1* | 5/2010 | Kinoshita et al. | 524/493 |

FOREIGN PATENT DOCUMENTS

| | | | |
|---|---|---|---|
| JP | 46-011600 B | | 3/1971 |
| JP | 49-051367 A | | 5/1974 |
| JP | 49-059176 A | | 6/1974 |
| JP | 50-008869 A | | 1/1975 |
| WO | WO2008010607 | * | 1/2008 |
| WO | WO2008096612 | * | 8/2008 |

* cited by examiner

*Primary Examiner* — Kevin M. Bernatz  
*Assistant Examiner* — Louis Falasco  
(74) *Attorney, Agent, or Firm* — Westerman, Hattori, Daniels & Adrian, LLP

(57) ABSTRACT

Disclosed are a biaxially oriented polyester film which is excellent in dimensional stability, especially dimensional stability against environmental changes in, for example, temperature and humidity, and a polyester capable of providing the biaxially oriented polyester film with excellent dimensional stability.

There is provided a copolymerized aromatic polyester containing aromatic dicarboxylic acid components represented by the following formulae (I) and (II) and a glycol component represented by the following formula (III), wherein a 4,4'-(alkylenedioxy)bisbenzoic acid component represented by the formula (I) is contained in an amount of 5% by mole or more and less than 90% by mole on the basis of a molar number of an aromatic dicarboxylic acid component; and a film thereof.

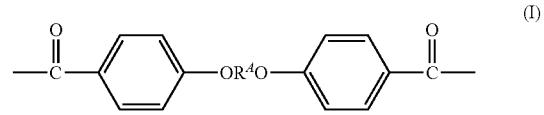
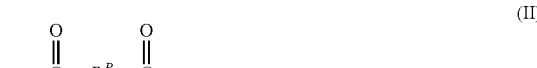
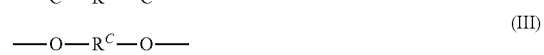

In the structural formulae (I) to (III), $R^A$ represents an alkylene group having 1 to 10 carbon atoms; $R^B$ represents a phenylene group or a naphthalenediyl group; and $R^C$ represents an alkylene group having 2 to 4 carbon atoms or a cycloalkylene group having 8 to 10 carbon atoms.

19 Claims, No Drawings

COPOLYMERIZED AROMATIC POLYESTER, BIAXIALLY ORIENTED POLYESTER FILM, AND MAGNETIC RECORDING MEDIUM

FIELD OF THE INVENTION

The present invention relates to an aromatic polyester having a 4,4'-(alkylenedioxy)bisbenzoic acid copolymerized therein and to a biaxially oriented polyester film and a magnetic recording medium each using the same.

BACKGROUND OF THE INVENTION

Aromatic polyesters typified by polyethylene terephthalate and polyethylene-2,6-naphthalene dicarboxylate are widely used in films because they have excellent mechanical properties, dimensional stability and heat resistance. Especially, polyethylene-2,6-naphthalate has more excellent mechanical properties, dimensional stability and heat resistance than polyethylene terephthalate and are used in fields in which these requirements are severe, for example, a base film of a high-density magnetic recording medium. However, in recent years, the requirement for dimensional stability in the high-density magnetic recording media is becoming higher and higher, and a further improvement of the characteristics is desired.

Meanwhile, in Patent Documents 1 to 4, films obtained from polyethylene-1,2-diphenoxyethane-4,4'-dicarboxylate are proposed. According to these patent documents, films having high strength and low thermal shrinkage are obtained.

In polyethylene-1,2-diphenoxyethane-4,4'-dicarboxylate proposed in these patent documents, since its crystallization temperature is very low and close to a glass transition point, there was involved such a problem that promotion of the crystallization becomes vigorous with a lapse of stretching, so that sufficient stretching cannot be achieved. Then, in the above-mentioned patent documents, it is proposed to perform stretching stepwise for the purpose of carrying out uniform stretching.

However, in conventional apparatuses for manufacturing films of polyethylene terephthalate or polyethylene naphthalate, the above-mentioned stepwise stretching cannot be carried out, and there was involved such a problem that a special apparatus is needed.

Meanwhile, the requirement for an improvement of the recording density in magnetic recording media of recent years or the like is severe. Following this, there have been circumstances where the dimensional stability demanded in the base film cannot be achieved in not only the polyethylene terephthalate film but the polyethyoene-2,6-naphthalate film.
(Patent Document 1) JP-B-46-11600
(Patent Document 2) JP-A-49-51367
(Patent Document 3) JP-A-49-59176
(Patent Document 4) JP-A-50-8869

DISCLOSURE OF THE INVENTION

A first object of the present invention is to provide a biaxially oriented polyester film which is excellent in dimensional stability, especially dimensional stability against environmental changes in, for example, temperature and humidity, and a polyester capable of providing the foregoing biaxially oriented polyester film having excellent dimensional stability and a biaxially polyester film using the same.

A second object of the present invention is to provide a biaxially oriented polyester film which is easy to make dimensional stability against environmental changes in, for example, temperature and humidity, flatness and winding properties compatible with each other.

Furthermore, a third object of the present invention is to provide a biaxially oriented polyester film which is excellent in dimensional stability against humidity changes and excellent in film forming properties on stretching or the like.

Moreover, a fourth object of the present invention is to provide a biaxially oriented polyester film which is excellent in dimensional stability and film forming properties, free from a problem of curl and excellent in processing characteristics at high temperatures.

In the biaxially oriented polyester film, all of a humidity expansion coefficient and a temperature expansion coefficient have a close relationship with the Young's modulus. In general, as the Young's modulus is higher, the humidity expansion coefficient and the temperature expansion coefficient become lower. However, the Young's modulus cannot be increased indefinitely, and there is limitation to the Young's modulus from the viewpoints of securing film forming properties and Young's modulus in the orthogonal direction. For that reason, as a result of extensive and intensive investigations on whether or not when the Young's modulus is identical, a film having a lower expansion coefficient against the temperature or humidity is obtained, the present inventors thought that in view of the fact that the foregoing film composed of polyethylene-1,2-diphenoxyethane-4,4'-dicarboxylate shows a low humidity expansion coefficient, though this film is problematic in the film forming properties, it is a suitable film.

Then, the present inventors have astonishingly found that when a 4,4'-(alkylenedioxy)bisbenzoic acid component is used as a copolymerization component, a film having both excellent characteristics of the polyalkylene-1,2-diphenoxyalkylene-4,4'-dicarboxylate and the aromatic polyester as a copolymerization partner is obtained, leading to accomplishment of the present invention.

Thus, according to the present invention, there are provided a copolymerized aromatic polyester containing aromatic dicarboxylic acid components represented by the following formulae (I) and (II) and a glycol component represented by the following formula (III), wherein
a 4,4'-(alkylenedioxy)bisbenzoic acid component represented by the formula (I) is contained in an amount of 5% by mole or more and less than 90% by mole on the basis of a molar number of a wholly aromatic dicarboxylic acid component constituting the copolymerized aromatic polyester; and a biaxially polyester film using the same.

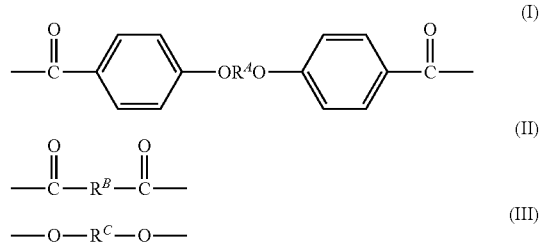

In the structural formulae (I) to (III), $R^A$ represents an alkylene group having 1 to 10 carbon atoms; $R^B$ represents a phenylene group or a naphthalenediyl group; and $R^C$ represents an alkylene group having 2 to 4 carbon atoms or a cycloalkylene group having 8 to 10 carbon atoms.

Also, the present inventors have found that by using a film layer composed of the foregoing copolymerized aromatic polyester as one layer of a laminated film and bringing specified surface properties on each surface, a biaxially oriented laminated polyester film having flatness and winding properties in addition to dimensional stability is obtained, leading to accomplishment of the present invention.

Thus, according to the present invention, there is also provided a biaxially oriented laminated polyester film having a film layer B laminated on one surface of a film layer A, wherein a surface roughness (RaB) on the side of the film layer B of the biaxially oriented laminated polyester film is larger by 1.0 nm or more than a surface roughness (RaA) on the side of the film layer A; and at least one of the film layers is composed of the foregoing copolymerized aromatic polyester.

Moreover, as described above, the film composed of polyethylene-1,2-diphenoxyethane-4,4'-dicarboxylate is poor in film forming properties such as stretching because the crystallization temperature and the glass transition point are close to each other, so that it was difficult to adjust the temperature expansion coefficient by means of stretching or the like. However, the present inventors have astonishingly found that when the film layer composed of a copolymerized aromatic polyester is used as a film layer forming a multi-layer film, the film layer has excellent characteristics of each of the polyalkylene-1,2-diphenoxyethane-4,4'-dicarboxylate, the aromatic polyester as a copolymerization partner thereof and the aromatic polyester forming other film layer and is excellent in the film forming properties.

Thus, according to the present invention, there is provided the biaxially oriented polyester film which is a biaxially oriented multi-layer laminated film having five or more layers of each of a film layer (A') and a film layer (B'), wherein the film layer (B') is composed of an aromatic polyester (B') having a recurring unit (I') represented by the following formula (I') and a recurring unit (II') represented by the following formula (II') in amounts of 5% by mole or more and less than 80% by mole and more than 20% by mole and not more than 95% by mole, respectively on the basis of a molar number of the recurring units; and the film layer (A') is composed of an aromatic polyester (A') having more than 95% by mole of the recurring unit represented by the following formula (II').

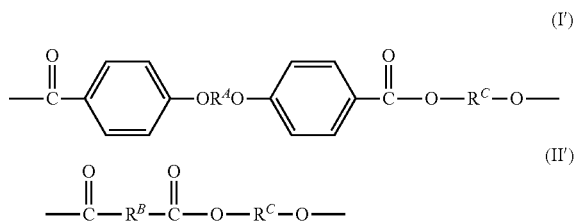

In the formulae (I') and (II'), $R^A$ represents an alkylene group having 1 to 10 carbon atoms; $R^B$ represents a phenylene group or a naphthalenediyl group; and $R^C$ represents an alkylene group having 2 to 4 carbon atoms or a cycloalkylene group having 8 to 10 carbon atoms.

BEST MODE FOR CARRYING OUT THE INVENTION

<Aromatic Polyester>

The copolymerized aromatic polyester of the present invention is composed of an aromatic dicarboxylic acid component and a glycol component.

First, the 4,4'-(alkylenedioxy)bisbenzoic acid component represented by the structural formula (I) is specifically one in which a moiety of $R^A$ is an alkylene group having 1 to 10 carbon atoms, and preferred examples thereof include a 4,4'-(ethylenedioxy)bisbenzoic acid component, a 4,4'-(trimethylenedioxy)bisbenzoic acid component and a 4,4'-(butylenedioxy)bisbenzoic acid component. Of these, from the standpoint of effects of the present invention, those having an even carbon number of $R^A$ in the general formula (I) are preferable, and a 4,4'-(ethylenedioxy)bisbenzoic acid component is especially preferable.

Next, the aromatic dicarboxylic acid component represented by the formula (II) is specifically one in which a moiety of $R^B$ is a phenylene group or a naphthalenediyl group, and examples thereof include a terephthalic acid component, an isophthalic acid component, a 2,6-naphthalene dicarboxylic acid component and a 2,7-naphthalene dicarboxylic acid component. Of these, from the standpoint of effects of the present invention, a terephthalic acid component and a 2,6-naphthalene dicarboxylic acid component capable of relatively easily improving physical properties such as mechanical strength are preferable, and a 2,6-naphthalene dicarboxylic acid component is especially preferable.

Finally, the glycol component represented by the formula (III) is a glycol component in which a moiety of $R^C$ is an alkylene group having 2 to 4 carbon atoms or a cycloalkylene group having 8 to 10 carbon atoms, and examples thereof include an ethylene glycol component, a trimethylene glycol component, a tetramethylene glycol component and a cyclohexane dimethanol component. Of these, from the standpoint of effects of the present invention, an ethylene glycol component capable of relatively easily improving physical properties such as mechanical strength is preferable.

In this connection, the copolymerized aromatic polyester of the present invention may be copolymerized with a copolymerization component which is known per se, for example, an aliphatic dicarboxylic acid component, an alicyclic dicarboxylic acid component, an alkylene glycol component which does not fall within the scope of the formula (III), a hydroxycarboxylic acid component and a trifunctional or polyfunctional functional group-containing acid component such as trimellitic acid, or an alcohol component or the like so far as the effects of the present invention are not impaired. As a matter of course, a total molar number of the aromatic dicarboxylic acid components represented by the formulae (I) and (II) and the glycol component represented by the formula (III) is preferably 90% by mole or more, and more preferably 95% by mole or more on the basis of the molar number of the wholly aromatic dicarboxylic acid component constituting the copolymerized aromatic polyester.

Now, a characteristic feature of the copolymerized aromatic polyester of the present invention resides in the matter that the 4,4'-(alkylenedioxy)bisbenzoic acid component represented by the formula (I) is copolymerized in an amount of 5% by mole or more and less than 90% by mole on the basis of the molar number of the wholly aromatic dicarboxylic acid component constituting the copolymerized aromatic polyester. When the proportion of the 4,4'-(alkylenedioxy)bisbenzoic acid component is less than the lower limit, the effect for reducing the humidity expansion coefficient is hardly revealed. On the other hand, when it exceeds the upper limit, the film forming properties are impaired, the mechanical characteristics such as the Young's modulus are hardly improved by stretching, and the temperature expansion coefficient is hardly lowered. In an extreme case, the film is broken in a film forming step such as stretching. Also, astonishingly, the effect for reducing the humidity expansion coefficient by the 4,4'-(alkylenedioxy)bisbenzoic acid component is efficiently revealed even when its amount is relatively small. From such viewpoints, an upper limit of the content proportion of the 4,4'-(alkylenedioxy)bisbenzoic acid component is preferably not more than 78% by mole; whereas a lower limit thereof is preferably 5% by mole or more, more preferably 10% by mole or more, and still more preferably 20% by mole or more.

From such viewpoints, with respect to a proportion of the aromatic dicarboxylic acid component represented by the formula (II), an upper limit thereof is preferably not more than 95% by mole, more preferably not more than 90% by mole, and especially preferably not more than 80% by mole; and a lower limit thereof is preferably 10% by mole or more, and more preferably 22% by mole or more.

By forming a copolymerized aromatic polyester having such a specified amount of the 4,4'-(alkylenedioxy)bisbenzoic acid component copolymerized therein, moldings in which both the temperature expansion coefficient and the humidity expansion coefficient are low, for example, films, etc. can be manufactured.

In this connection, a copolymerization ratio of the 4,4'-(alkylenedioxy)bisbenzoic acid component can be adjusted by adjusting a composition of raw materials so as to reveal the desired copolymerization ratio at a polymerization stage; or preparing a homopolymer using only the 4,4'-(alkylenedioxy)bisbenzoic acid component as an acid component or a polymer in which the copolymerization ratio of the 4,4'-(alkylenedioxy)bisbenzoic acid component is large and a non-copolymerized polymer or a polymer in which the copolymerization ratio is small, and melt kneading these materials to achieve transesterification so as to reveal the desired copolymerization ratio.

<Manufacturing Method of Aromatic Polyester Resin>

A manufacturing method of the copolymerized aromatic polyester of the present invention is hereunder described in detail.

As the 4,4'-(alkylenedioxy)bisbenzoic acid component represented by the structural formula (I), it is preferable to use an alkyl ester, and it is especially preferable to use Dimethyl 4,4'-(ethylenedioxy)bisbenzoate. Dimethyl 4,4'-(ethylenedioxy)bisbenzoate can be obtained by allowing methyl p-hydroxybenzoate to react with a dihaloethane in an anhydrous polar solvent in the presence of potassium carbonate.

Also, with respect to the aromatic polyester of the present invention, a 4,4'-(alkylenedioxy)bisbenzoic acid and an alkyl ester derivative thereof are allowed to react with, for example, ethylene glycol to manufacture a polyester precursor. On that occasion, the reaction can also be carried out together with other aromatic dicarboxylic acid component, for example, 2,6-naphthalene dicarboxylic acid or terephthalic acid or an ester forming derivative thereof. The thus obtained polyester precursor is then polymerized in the presence of a polymerization catalyst, whereby the aromatic polyester of the present invention can be obtained. If desired, solid phase polymerization or the like may be applied. From the standpoint of effects of the present invention, an intrinsic viscosity of the thus obtained aromatic polyester as measured at 35° C. using a p-chlorophenol/1,1,2,2-tetrachloroethane mixed solvent (weight ratio: 40/60) is preferably 0.4 to 1.5 dL/g, and more preferably 0.5 to 1.2 dL/g.

Also, the reaction on the occasion of manufacturing the polyester precursor is preferably carried out at a temperature ranging from 190° C. to 250° C. at atmospheric pressure or under an increased pressure. When the reaction temperature is lower than 190° C., the sufficient reaction hardly proceeds, whereas when it is higher than 250° C., diethylene glycol as a by-product or the like is easily produced.

In this connection, in the reaction step of manufacturing the polyester precursor, a known esterification or transesterification reaction catalyst may be used. Examples thereof include manganese acetate, zinc acetate, alkali metal compounds, alkaline earth metal compounds and titanium compounds. Of these, titanium compounds which when formed into a film, are able to suppress surface projections are preferable.

Next, a polycondensation reaction is described. First, a polycondensation temperature is preferably a melting point of the obtained polymer or higher and not more than 230 to 300° C., and more preferably a temperature higher than the melting point by 5° C. or higher to a temperature higher than the melting point by 30° C. In general, it is preferable that the polycondensation reaction is carried out under a reduced pressure of not more than 100 Pa.

Examples of a polycondensation catalyst include metal compounds containing at least one metal element. In this connection, the polycondensation catalyst can also be used in the esterification reaction. Examples of the metal element include titanium, germanium, antimony, aluminum, nickel, zinc, tin, cobalt, rhodium, iridium, zirconium, hafnium, lithium, calcium and magnesium. Preferred examples of the metal include titanium, germanium, antimony, aluminum and tin. The use of a titanium compound is especially preferable because as described above, when formed into a film, it is able to suppress high surface projections to be formed due to an influence of the residual metal which is used in the catalyst.

These catalysts may be used singly or in combinations. An amount of the catalyst is preferably 0.001 to 0.1% by mole, and more preferably 0.005 to 0.05% by mole relative to the molar number of the recurring units of the aromatic polyester.

Specific examples of the titanium compound as the esterification catalyst, the transesterification catalyst and the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanium, ammonium oxalate titanate, titanium oxide, an orthoester or condensation orthoester of titanium, a reaction product composed of an orthoester or condensation orthoester of titanium and a hydroxycarboxylic acid, a reaction product composed of an orthoester or condensation orthoester of titanium, a hydroxycarboxylic acid and a phosphorus compound and a reaction product composed of an orthoester or condensation orthoester of titanium, a polyhydric alcohol having at least two hydroxyl groups and 2-hydroxycarboxylic acid or a base.

Then, as described above, the copolymerized aromatic polyester of the present invention may be polymerized in such a manner that a copolymerized aromatic polyester having a desired copolymerization ratio is formed, or may be prepared by two or more kinds of aromatic polyesters having a different copolymerization ratio from each other are prepared and melt kneaded to prepare a blend so as to reveal a desired copolymerization ratio because the transesterification reaction proceeds at the time of melt kneading.

<Film>

The biaxially oriented polyester film of the present invention can be prepared by subjecting the copolymerized aromatic polyester to melt film formation, extruding into a sheet form and then stretching in the machine direction (hereinafter also referred to as "longitudinal direction", "lengthwise direction" or "MD direction") and the direction orthogonal thereto (hereinafter also referred to as "width direction", "transverse direction" or "TD direction"). Then, as described above, since crystallinity is improved, the resulting film is excellent in film forming properties, for example, one having a uniform thickness.

As a matter of course, since the resulting film is a film obtained by melt film forming the copolymerized aromatic polyester of the present invention, the film has excellent mechanical characteristics of the aromatic polyester composed of the 4,4'-(alkylenedioxy)bisbenzoic acid component and the formulae (II) and (III). Also, the biaxially oriented polyester film is not limited to a single layer but may be a laminated film. In that case, it will be understood with ease that the laminated film may be one in which at least one layer thereof is a film layer composed of the copolymerized aromatic polyester of the present invention.

Now, in the biaxially oriented polyester film of the present invention, from the standpoint of revealing excellent dimensional stability, it is preferable that a temperature expansion coefficient ($\alpha t$) in at least direction in the plane direction of the film is not more than 14 ppm/° C. In this connection, with respect to the temperature expansion coefficient ($\alpha t$) in the width direction of the film, when the temperature expansion coefficient in at least one direction of the film is preferably not more than the upper limit, for example, the direction is made in conformity with the direction of the film where the dimensional stability is most likely required, it is possible to reveal excellent dimensional stability against environmental changes on the obtained film. A lower limit of the temperature expansion coefficient ($\alpha t$) is preferably −10 ppm/° C. or more, more preferably −7 ppm/° C. or more, and especially preferably −5 ppm/° C. or more; and an upper limit thereof is more preferably not more than 10 ppm/° C., still more preferably not more than 7 ppm/° C., and especially preferably not more than 5 ppm/° C. Also, for example, when formed into a magnetic recording tape, in view of the fact that excellent dimensional stability against dimensional changes due to ambient temperature and humidity changes, the direction where the temperature expansion coefficient is satisfied is preferably the width direction of the biaxially oriented polyester film.

Also, in the biaxially oriented polyester film of the present invention, a humidity expansion coefficient ($\alpha h$) and a Young's modulus (Y) of the film in at least one direction of the film plane direction, and preferably in the direction where the temperature expansion coefficient is not more than 14 ppm/° C. satisfy a relationship of the following expression (1).

$$\alpha h < -1.2Y + 17 \quad (1)$$

In the expression (1), $\alpha h$ represents a humidity expansion coefficient (ppm/% RH); and Y represents a Young's modulus (GPa).

In the case where the obtained biaxially oriented polyester film does not satisfy the relationship of the above expression (1), the polyester film merely has an ah equal to the Young's modulus of a conventional film made of polyethylene terephthalate or polyethylene-2,6-naphthalate, and the effect for reducing the humidity expansion to be brought by copolymerizing a polyalkylene-1,2-diphenoxyethane-4,4'-dicarboxylate in a specified range is not sufficiently revealed. In this connection, the coefficient "−1.2" in the expression (1) is derived from the relationship between the Young's modulus and ah of the Examples and Comparative Examples of the present invention. The relationship between the humidity expansion coefficient ($\alpha h$) and the Young's modulus (Y) is preferably the following expression (1'), and more preferably the following expression (1").

$$\alpha h < -1.2Y + 16.5 \quad (1')$$

$$\alpha h < -1.2Y + 16.0 \quad (1'')$$

In this connection, with respect to the relational expression between the Young's modulus and $\alpha h$, though a lower limit thereof is not particularly limited, it is usually approximately one represented by the following expression (1''').

$$\alpha h > -1.2Y + 12.0 \quad (1''')$$

The Young's modulus, $\alpha t$ and $\alpha h$ can be adjusted by the foregoing copolymerization composition and stretching as described later.

Furthermore, a preferred embodiment of the biaxially oriented polyester film of the present invention is further described in detail.

In the biaxially oriented polyester film of the present invention, the Young's modulus of the film in at least one direction of the film plane direction, and preferably in the direction where the temperature expansion coefficient is not more than 14 ppm/° C. is preferably at least 4.5 GPa or more. Though an upper limit thereof is not particularly limited, in general, it is preferably about 12 GPa. A range of the Young's modulus is more preferably 5 to 11 GPa, and especially preferably 6 to 10 GPa. When the Young's modulus falls outside the foregoing range, there may be the case where it is difficult to attain the foregoing $\alpha t$ and $\alpha h$, or the mechanical characteristics are insufficient. Such a Young's modulus can be adjusted by the foregoing blend or copolymerization composition and stretching as described later. Also, in the biaxially oriented polyester film of the present invention, for example, when used in a base film of a magnetic tape, the humidity expansion coefficient in at least one direction of the film plane direction, and preferably in the direction where the temperature expansion coefficient is not more than 14 ppm/° C. is preferably 1 to 7 (ppm/% RH), more preferably 3 to 7 (ppm/% RH), and especially preferably 3 to 6 (ppm/% RH). Though a lower limit thereof is not particularly limited, in general, it is preferably about 1 (ppm/% RH). When the humidity expansion coefficient falls outside the foregoing range, the dimensional changes against humidity changes become large. Such a humidity expansion coefficient can be adjusted by the foregoing blend or copolymerization composition and stretching as described later.

In this connection, the direction where the temperature expansion coefficient is not more than 14 ppm/° C. may be at least one direction, and preferably one where the width direction is satisfied as described above. As a matter of course, in view of the dimensional stability, it is preferable that the direction orthogonal to the width direction similarly satisfies not only the temperature expansion coefficient and humidity expansion coefficient but the Young's modulus and the like.

Also, the copolymerized aromatic polyester of the present invention may be blended with an additive which is known per se, or other resin to form a composition so far as the effects of the present invention are not impaired. Examples of the additive include a stabilizer such as an ultraviolet absorbent, an antioxidant, a plasticizer, a lubricant, a flame retardant, a release agent, a pigment, a nucleating agent, a filler or a glass fiber, a carbon fiber and a lamellar silicate. The additive may be properly chosen depending upon the required application. Also, examples of other resin include aliphatic polyester resins, polyamide resins, polycarbonates, an ABS resin, crystalline resins, polymethylmethacrylate, polyamide elastomers, polyester elastomers, polyether imides and polyimides.

<Manufacturing Method of Biaxially Oriented Polyester Film>

The biaxially oriented polyester film of the present invention is stretched in the machine direction and the width direction to increase molecular orientation in the respective directions. It is preferable that the biaxially oriented polyester film of the present invention is manufactured by, for example, the following method because it is easy to increase the Young's modulus and to reduce the temperature expansion coefficient and the humidity expansion coefficient while keeping the film forming properties.

First, the copolymerized aromatic polyester of the present invention is used as a raw material, dried and then supplied into an extruder heated at a temperature of a melting point (Tm: ° C.) of the aromatic polyester to (Tm+50)° C., and the melt is extruded in a sheet form from a die, for example, a T-die or the like. This extruded material in a sheet form is quenched for solidification by a rotating cooling drum or the like to form an unstretched film, and the unstretched film is further biaxially oriented.

In this connection, in order to achieve αt, αh and Young's modulus and the like as specified in the present invention, it is necessary to facilitate subsequent stretching. In the polyester polymer of the present invention, there is a tendency that its crystallization rate is fast, and from such a viewpoint, it is preferable to carry out cooling by the cooling drum very quickly. From such a viewpoint, it is preferable to carry out cooling at a low temperature of 20 to 60° C. When cooling is carried out at such a low temperature, the crystallization in a state of the unstretched film is suppressed, and it becomes possible to carry out subsequent stretching more smoothly.

For biaxial stretching, a method which is known per se can be adopted, and the biaxial stretching may be either sequential biaxial stretching or simultaneous biaxial stretching.

Here, a manufacturing method of sequential biaxial stretching in which longitudinal stretching, lateral stretching and heat treatment are carried out in this order is described as an example. First, first longitudinal stretching is carried out to an extent of 3 to 8 times at a temperature of a glass transition temperature (Tg: ° C.) of the copolymerized aromatic polyester to (Tg+40)° C.; stretching in the transverse direction is carried out to an extent of 3 to 8 times at a temperature higher than that of the preceding longitudinal stretching and ranging from (Tg+10) to (Tg+50)° C.; and as the heat treatment, a heat set treatment is carried out at a temperature not higher than a melting point of the copolymerized aromatic polyester and ranging (Tg+50) to (Tg+150)° C. for 1 to 20 seconds, and preferably 1 to 15 seconds.

In this connection, in the polyalkylene-1,2-diphenoxyethane-4,4'-dicarboxylate, since the temperature at which the crystallization commences is too low, it was difficult to carry out sufficient stretching even at the foregoing temperature. However, in the biaxially oriented polyester film of the present invention, in view of the fact that not only the 4,4'-(alkylenedioxy)bisbenzoic acid component but the aromatic dicarboxylic acid represented by the formula (II) are copolymerized, it is possible to achieve stretching.

While the sequential biaxial stretching has been described above, the biaxially oriented polyester film of the present invention can also be manufactured by simultaneous biaxial stretching in which longitudinal stretching and lateral stretching are carried out at the same time. For example, the simultaneous biaxial stretching may be carried out by reference to the previously described stretching ratio and stretching temperature and the like.

Also, in the case where the biaxially polyester film of the present invention is a laminated film, two or more kinds of molten polyesters are laminated within a die and then extruded into a film form, and preferably, the molten polyesters are extruded at a temperature of a melting point (Tm: ° C.) of each polyester to (Tm+70)° C. Alternatively, two or more kinds of molten polyesters are extruded from a die, laminated and then quenched for solidification to form a laminated unstretched film. Subsequently, the unstretched film is subjected to biaxial stretching and heat treatment in the same methods as in the case of the foregoing single-layered film. Also, in the case of providing the foregoing coating layer, it is preferable that a desired coating solution is coated on one surface or both surfaces of the unstretched film or monoaxially oriented film and subsequently subjected to biaxial stretching and heat treatment in the same methods as in the case of the foregoing single-layered film.

According to the present invention, by using the biaxially oriented polyester film of the present invention as a base film, forming a nonmagnetic layer and a magnetic layer in this order on one surface thereof and forming a backcoat layer on the other surface, or other means, a magnetic recording tape for data storage or the like can be provided.

Now, as described above, the biaxially oriented polyester film of the present invention is not limited to the single-layered film but may be a laminated film. In this way, it is easy to make both flatness and winding properties compatible with each other.

The case where the biaxially oriented polyester film of the present invention is a biaxially oriented laminated polyester film is hereunder described.

In the case where the biaxially oriented polyester film of the present invention is a biaxially oriented polyester film composed of a laminate of a film layer A and a film layer B, at least one of the film layer A and the film layer B may be composed of the foregoing copolymerized aromatic polyester, and the other film lay may be composed of a polyester other than the foregoing copolymerized aromatic polyester.

Specific examples of the polyester other than the foregoing copolymerized aromatic polyester include polyalkylene terephthalates containing an alkylene terephthalate as a recurring unit, such as polyethylene terephthalate, polytrimethylene terephthalate and polybutylene terephthalate; and polyalkylene-2,6-naphthalates containing an alkylene-2,6-naphthalate as a recurring unit, such as polyethylene-2,6-naphthalene dicarboxylate, polytrimethylene-2,6-naphthalate and polybutylene-2,6-naphthalate. Of these, from the standpoints of mechanical characteristics and the like, polyethylene terephthalate and polyethylene-2,6-naphthalane dicarboxylate are preferable, and polyethylene-2,6-naphthalane dicarboxylate is especially preferable. Also, it is preferable to copolymerize a copolymerization component capable of increasing a glass transition temperature or to blend a polyether imide or a liquid crystal resin (see, for example, JP-A-2000-355631, JP-A-2000-141475, JP-A-11-1568, etc.). In particular, in the case where ethylene terephthalate is a main recurring unit, it is preferable to carry out such copolymerization or blending. Also, from the viewpoint of improving the dimensional stability against environmental changes, polyesters obtained by copolymerizing a 6,6'-(ethylenedioxy)di-2-naphthoic acid component, a 6,6'-(trimethylenedioxy)di-2-naphthoic acid component, a 6,6'-(butylenedioxy)di-2-naphthoic acid compound or the like, as described in WO 2008/096612 are preferable.

In this connection, though the aromatic polyester having the 4,4'-(alkylenedioxy)bisbenzoic acid component copolymerized therein may be at least used in either one of the film layer A or B, from the viewpoint of improving the dimensional stability against environmental changes, the aromatic polyester is preferably used in a thicker film layer, and most preferably used in the both film layers.

The aromatic polyester having a specified amount of the 4,4'-(alkylenedioxy)bisbenzoic acid component copolymerized therein and the polyester forming other layer may be copolymerized with other copolymerization component which is known per se unless an effect of the invention is blocked.

As described above, the biaxially oriented laminated polyester film of the present invention is a film having the film layer B laminated on one surface of the film layer A, and the surface roughness (RaB) on the side of the film layer B of the biaxially oriented laminated polyester film is larger by preferably 1.0 nm or more, more preferably 2.0 nm or more, and still more preferably 3.0 nm or more, than the surface roughness (RaA) on the side of the film layer A of the biaxially oriented laminated polyester film. By regulating a difference in the surface roughness between RaA and RaB to the lower limit or more, it is possible to bring the biaxially oriented laminated polyester film with excellent flatness and winding properties on high levels as compared with a single-layered film. In this connection, though an upper limit of the difference between RaA and RaB is not particularly limited, from the standpoint that the surface on the side of the film layer A is not impaired by the side of the film layer B, the upper limit of the difference between RaA and RaB is preferably not more than 8.0 nm, more preferably not more than 5.0 nm, and still more preferably not more than 4.0 nm.

Also, in the biaxially oriented laminated polyester film of the present invention, in order to bring the obtained laminated film with excellent flatness, the surface roughness (RaA) on the side of the film layer A is preferably 1.0 to 7.0 nm, more preferably 1.5 to 5.0 nm, and especially preferably 2.0 to 4.0 nm. Meanwhile, in order to bring the obtained laminated film with excellent winding properties, the surface roughness (RaB) on the side of the film layer B is preferably 5.0 to 15.0 nm, more preferably 6.0 to 10.0 nm, and especially preferably 6.0 to 8.0 nm.

In order to achieve such a surface roughness, inert particles may be incorporated, or projections may be formed in the film layer on the side to be roughed. Examples of the inert particle to be incorporated include (1) heat-resistant polymer particles (for example, particles made of a crosslinked silicone resin, crosslinked polystyrene, a crosslinked acrylic resin, a melamine-formaldehyde resin, an aromatic polyamide resin, a polyimide resin, a polyamide-imide resin, a crosslinked polyester, etc.); (2) particles made of an inorganic compound such as metal oxides (for example, aluminum oxide, titanium dioxide, silicon dioxide (silica), magnesium oxide, zinc oxide, zirconium oxide, etc.), metal carbonates (for example, magnesium carbonate, calcium carbonate, etc.), metal sulfates (for example, calcium sulfate, barium sulfate, etc.), carbons (for example, carbon black, graphite, diamond, etc.) and clay minerals (for example, kaolin, clay, bentonite, etc.); (3) externally added particles to be added in a particulate state, such as composite particles of a core-shell type using different raw materials in, for example, a core and a shell, respectively; and (4) internally deposited particles to be formed by deposition of a catalyst or the like. Of these, at least one kind of particles selected from the group consisting of a crosslinked silicone resin, a crosslinked acrylic resin, a crosslinked polyester, crosslinked polystyrene, aluminum oxide, titanium dioxide, silicon dioxide, kaolin and clay is especially preferable. In particular, at least one kind of particles selected from the group consisting of a crosslinked silicone resin, a crosslinked acrylic resin, a crosslinked polyester, crosslinked polystyrene and silicon dioxide (exclusive of porous silica or the like, however) is preferable because it is easy to make scattering of the particle size of the particles small. As a matter of course, two or more kinds of such materials may be used in combinations.

Also, the size or proportion of the inert particles to be incorporated may be adjusted depending upon the desired surface roughness of each of them. Specifically, an average particle size of the inert particles to be incorporated in the film layer B is preferably 0.05 to 1.0 µm, and more preferably 0.1 to 0.8 µm. In particular, when used in a magnetic recording medium, the average particle size of the inert particles to be incorporated in the film layer B is preferably 0.1 to 0.5 µm, and more preferably 0.1 to 0.3 µm. Also, a content of the inert particles to be incorporated in the film layer B is preferably 0.1 to 1.0% by weight, and more preferably 0.15 to 0.5% by weight on the basis of the weight of the film layer. In particular, when used in a magnetic recording medium, the content of the inert particles to be incorporated in the film layer B is preferably 0.2 to 0.4% by weight, and more preferably 0.2 to 0.3% by weight. Also, the film layer A does not contain the inert particles, or in the case where the film layer A contains the inert particles, an average particle size of the inert particles to be incorporated in the film layer A is preferably 0.01 to 0.3 µm, and more preferably 0.05 to 0.25 µm. In particular, when used in a magnetic recording medium, the average particle size of the inert particles to be incorporated in the film layer A is preferably 0.1 to 0.2 µm, and more preferably 0.1 to 0.15 µm. In the case where the film layer A contains the inert particles, a content of the inert particles to be incorporated in the film layer A is preferably 0.005 to 0.3% by weight, and more preferably 0.01 to 0.2% by weight on the basis of the weight of the film layer. In particular, when used in a magnetic recording medium, the content of the inert particles to be incorporated in the film layer A is preferably 0.05 to 0.15% by weight, and more preferably 0.1 to 0.1% by weight.

Now, the biaxially oriented laminated polyester film of the present invention is a film having the film layer B laminated on one surface of the film layer A, and other film layer may be interposed between the film layers A and B. Under such a circumstance, the following two can be exemplified as a preferred layer configuration of the biaxially oriented laminated polyester film.

First, a preferred first layer configuration is a layer configuration which is preferable in the case of enhancing the productivity while suppressing falling off of the inert particles and in which a thickness of the film layer B is 50 to 90%, preferably 55 to 85%, and more preferably 60 to 80% relative to the thickness of the whole of the laminated film. In view of the fact that the film layer B is larger in the surface roughness than the film layer A, the film layer B contains larger particles or a larger amount of particles as compared with the film layer A, so that by regulating the thickness of the film layer B to the lower limit or more, it easily inhibits falling off of such particles. Also, in the case where it is intended to recover and use a portion which will not become a product, as generated on the occasion of film forming of the biaxially oriented laminated polyester film, by regulating the thickness of the film layer B to the lower limit or more, a large amount of the recovered polymer (recovered chip) can be used in the film layer B, and the film cost can be controlled. In this connection, when the recovered chip is used in the film layer A, particles having a large particle size cannot be incorporated into only the film layer B, the adjustment of the surface roughness becomes difficult, and the flatness of the film layer A is impaired. On the other hand, when the thickness proportion of the film layer B exceeds the upper limit, the thickness of the film layer A becomes very thin; influences of the particles of the film layer B affect the film layer A; the surface becomes rough; and electromagnetic conversion characteristics are easily deteriorated. In this connection, from the viewpoint of dimensional stability, it is preferable that the copolymerized aromatic polyester is used in a thicker film layer. From such a viewpoint, in the first layer configuration, it is preferable that the copolymerized aromatic polyester is used in the film layer B.

Next, a preferred second layer configuration is a layer configuration in which flatness and running properties are easily brought on higher levels. A thickness of the film layer A is 50 to 97%, preferably 70 to 96%, and 80 to 95% relative to the thickness of the whole of the laminated film. As described above, in view of the fact that the film layer B is larger in the surface roughness than the film layer A, the film layer B contains larger particles or a larger amount of particles as compared with the film layer A. For that reason, the projections by the inert particles to be incorporated in the film layer B push up the surface of the film layer A, so that flatness of the surface of the film layer A is easily lowered. For that reason, by regulating the thickness of the film layer A to the lower limit or more, it is easy to suppress such a lowering of flatness. Also, what the thickness of the film layer A is made thick makes the thickness of the film layer B thin, and the positions in the thickness direction of the inert particles contained in the film layer B easily become even. As a result, the heights of the projections on the surface of the film layer B easily become even, so that there is brought such an advantage that it is easy to make the heights of the projections uniform. From such a viewpoint, the thickness of the film layer B is preferably 0.5 times to 4 times the average particle size of the contained inert particles having the largest average particle size. In this connection, from the viewpoint of dimensional stability, it is preferable that the copolymerized aromatic polyester is used in a thicker film layer. From such a viewpoint, in the second layer configuration, it is preferable that the copolymerized aromatic polyester is used in the film layer A.

A preferred embodiment of the biaxially oriented laminated polyester film of the present invention is further described in detail. In the biaxially oriented laminated polyester film of the present invention, in order that when used as a base film of a magnetic tape or the like, the base film may not elongate, it is preferable that at least one direction in the film plane direction has a high Young's modulus as 5.5 GPa or more. Moreover, by making the Young's modulus high, the humidity expansion coefficient can be made smaller. Though an upper limit of the Young's modulus is not limited, it is in general 11 GPa. The Young's modulus is preferably 3 to 10 GPa, more preferably 3.5 to 9 GPa, and especially preferably 4 to 8 GPa in the lengthwise direction of the film; and preferably 5 to 11 GPa, more preferably 5.5 to 11 GPa, and especially preferably 6 to 10 GPa in the width direction of the film, respectively.

Also, in the biaxially oriented laminated polyester film of the present invention, from the standpoint of revealing excellent dimensional stability, it is preferable that a temperature expansion coefficient ($\alpha t$) in at least one direction, and preferably in the width direction of the film is not more than 10 ppm/° C. When the temperature expansion coefficient in at least one direction of the film is not more than 10 ppm/° C., excellent dimensional stability against environmental changes can be revealed. Though a lower limit of the temperature expansion coefficient is not limited, it is in general −15 ppm/° C. The temperature expansion coefficient ($\alpha t$) is preferably −10 to 10 ppm/° C., more preferably −7 to 7 ppm/° C., and especially preferably −5 to 5 ppm/° C. This is because when formed into a magnetic recording tape, excellent dimensional stability against dimensional changes due to ambient temperature and humidity changes can be revealed.

Moreover, in the biaxially oriented laminated polyester film of the present invention, from the standpoint of revealing excellent dimensional stability, it is preferable that a humidity expansion coefficient in at least one direction, and preferably in the width direction of the film is preferably 1 to 7 ppm/% RH, more preferably 3 to 7 ppm/% RH, and especially preferably 3 to 6 ppm/% RH. This is because when formed into a magnetic recording tape, the dimensional stability can be revealed. In particular, when used in a base film for a magnetic recording tape, it is preferable that the direction with a small humidity expansion coefficient is the width direction of the biaxially oriented laminated polyester film because a deviation of the track or the like can be extremely suppressed. In this connection, in the present invention, the width direction of the film as referred to herein is the direction orthogonal to the machine direction of the film (also referred to as "lengthwise direction" or "longitudinal direction") and is also referred to as "transverse direction".

Also, the direction where the temperature expansion coefficient is not more than 10 ppm/° C. may be at least one direction, and preferably one where the width direction is satisfied as described above. However, from the standpoint of dimensional stability, it is preferable that the direction orthogonal thereto similarly satisfies not only the temperature expansion coefficient and humidity expansion coefficient but the Young's modulus and the like.

As a matter of course, in the biaxially oriented laminated polyester film of the present invention, from the viewpoint of dimensional stability against environmental changes, it is preferable that all of the film layers are composed of an aromatic polyester having a specified amount of the 4,4'-(alkylenedioxy)bisbenzoic acid component represented by the formula (I) copolymerized therein. In this connection, it may be said that the same described above with respect to the biaxially oriented polyester film of the present invention is applicable to the biaxially oriented laminated polyester film of the present invention, unless otherwise especially indicated.

<Manufacturing Method of Biaxially Oriented Laminated Polyester Film>

In the biaxially oriented laminated polyester film of the present invention, the same manufacturing method as the above-described manufacturing method of the biaxially oriented polyester film can be suitably adopted, unless otherwise especially indicated below.

First, polyesters (at least one film layer is composed of the copolymerized aromatic polyester having the 4,4'-(alkylenedioxy)bisbenzoic acid component copolymerized therein) are used as raw materials; and after drying, the polyesters are laminated in a molten state within a die preferably at a temperature of a melting point (Tm: ° C.) of the polyester forming each layer to (Tm+70)° C. and then extruded in a film form, or the respective molten polyesters are extruded in a sheet form from a die and then laminated. This extruded material in a sheet form is quenched for solidification to form a laminated unstretched film, and the laminated unstretched film is further biaxially oriented.

Next, with respect to the temperature of each of longitudinal stretching, lateral stretching and heat treatment, it is preferable that the polyester forming each film layer satisfies the temperature described above with respect to the biaxially oriented polyester film. In particular, from the viewpoint of enhancing the dimensional stability while making the projections uniform, a heat set treatment is carried out at a temperature of preferably 180 to 220° C., and more preferably 190 to 210° C. for 1 to 15 seconds.

Also, with respect to a method for incorporating inert particles, a method which is known per se can be adopted. For example, in a manufacturing step of the polyester, the inert particles may be added to the reaction system, or may be added to the polyester by means of melt kneading. From the standpoint of dispersibility of the particles, a method in which the inert particles are added to the reaction system of the polyester to manufacture a polyester composition having a high particle concentration as a master polymer, and the master polymer is mixed with a polyester composition not containing a particle or having a low particle concentration is preferable.

According to the present invention, a magnetic recording tape can be provided by using the biaxially oriented laminated polyester film of the present invention as a base film, forming a nonmagnetic layer and a magnetic layer in this order on the surface on the side of the film layer A thereof and forming a backcoat layer on the surface on the side of the film layer B thereof.

Now, as described above, the biaxially polyester film of the present invention is preferably the biaxially oriented laminated polyester film. The biaxially polyester film of the present invention is also preferably the following biaxially oriented multi-layer laminated film.

<Biaxially Oriented Multi-Layer Laminated Film>

The biaxially oriented multi-layer laminated film of the present invention is a biaxially oriented multi-layer laminated film having five or more layers of each of a film layer (A') and a film layer (B'). With respect to a lamination number, from the standpoints of uniformity of the layer configuration and revealment of the effects, a total layer number of the film layer (A') and the film layer (B') is preferably 31 to 10,001, and more preferably 51 to 1,001. When the lamination number is less than the lower limit, an effect for improving stretchability easily becomes small, and the generation of curl is hardly inhibited. In this connection, an upper limit of the lamination number is not particularly limited. However, from the standpoint of easiness of keeping a laminated structure, the lamination number is preferably not more than the foregoing upper limit. Also, from the standpoints of uniformity of the layer configuration and revealment of the effects, a thickness per layer of the film layer (A') is preferably 0.1 to 1,000 nm, and more preferably 1 to 100 nm.

<Aromatic Polyester (B')>

One of the characteristic features of the present invention resides in the matter that the aromatic polyester constituting the film layer (B') is composed of an aromatic polyester (B') having a recurring unit (I') represented by the foregoing formula (I') and a recurring unit (II') represented by the foregoing formula (II') in amounts of 5% by mole or more and less than 80% by mole and more than 20% by mole and not more than 95% by mole, respectively on the basis of a molar number of the recurring units. When the proportion of the recurring unit of the formula (I') is less than the lower limit, the effect for reducing the humidity expansion coefficient is hardly revealed. In this connection, from the viewpoints of moldability and the like, the upper limit is less than 80% by mole. The upper limit of the copolymerization ratio of the recurring unit (I') is preferably not more than 78% by mole, more preferably not more than 60% by mole, still more preferably not more than 50% by mole, and especially preferably not more than 40% by mole. On the other hand, the lower limit thereof is preferably 5% by mole or more, more preferably 7% by mole or more, still more preferably 10% by mole or more, and especially preferably 15% by mole or more.

In this way, by using the aromatic polyester having a specified amount of the recurring unit (I') copolymerized therein in the film layer (B), so far as the Young's modulus is identical, the humidity expansion coefficient can be made lower.

In this connection, $R^A$, $R^B$ and $R^C$ in the recurring units (I') and (II') are the same as those described in the foregoing formulae (I), (II) and (III). As a matter of course, the aromatic polyester (B) in the present invention may be copolymerized with other copolymerization component which is known per se, so far as the effects of the present invention are not impaired.

From these viewpoints, the recurring unit (II') is preferably ethylene terephthalate or ethylene-2,6-naphthalene dicarboxylate, and most preferably ethylene-2,6-naphthalene dicarboxylate.

Now, from the standpoint of film forming properties and mechanical characteristics of the obtained film, a melting point as measured by DSC of the aromatic polyester (B') in the present invention is preferably 200 to 260° C., more preferably 210 to 255° C., and especially preferably 215 to 250° C. Also, from the standpoints of stretchability, heat resistance and dimensional stability of the film, a glass transition temperature (hereinafter also referred to as "Tg") as measured by DSC of the aromatic polyester (B') in the present invention is preferably 80 to 120° C., more preferably 85 to 118° C., and especially preferably 90 to 116° C. In this connection, such melting point and glass transition temperature can be adjusted by controlling the kind and copolymerization ratio of the copolymerization components, control of a dialkylene glycol as a by-product and the like. In this connection, from the viewpoint of processability at high temperatures after forming into a film, for example, processability in coating of a magnetic layer, etc., it is preferable that Tg is as high as possible. For that reason, so far as the objects of the present invention are not impaired, it is also a preferred embodiment to copolymerize a copolymerization component capable of increasing the glass transition temperature or to blend a polyether imide or a liquid crystal resin (see, for example, JP-A-2000-355631, JP-A-2000-141475, JP-A-11-1568, etc.).

In this connection, a copolymerization ratio of the 4,4'-(alkylenedioxy)bisbenzoic acid component can be adjusted by adjusting a composition of raw materials so as to reveal the desired copolymerization ratio at a polymerization stage; or preparing a homopolymer using only the 4,4'-(alkylenedioxy)bisbenzoic acid component as an acid component or a polymer in which the copolymerization ratio of the 4,4'-(alkylenedioxy)bisbenzoic acid component is large and a non-copolymerized polymer or a polymer in which the copolymerization ratio is small, and melt kneading these materials to achieve transesterification so as to reveal the desired copolymerization ratio.

<Aromatic Polyester (A')>

In the aromatic polyester (A') in the present invention, the film layer (A') is constituted for the purpose of revealing mechanical characteristics such as Young's modulus so as to endure the practical use while enhancing stretchability of the film layer (B') composed of the aromatic polyester (B'). For that reason, the film layer (A') is preferably required to have more than 95% by mole of the recurring unit represented by the foregoing formula (II').

In consequence, a copolymerization ratio of the 4,4'-(alkylenedioxy)bisbenzoic acid component of the aromatic polyester (A') is preferably required to be less than 5% by mole on the basis of a molar amount of the whole of the acid components. Also, in $R^C$ which is the recurring unit constituting each of the aromatic polyester (A) and the aromatic polyester (B), an ethylene group accounts for 90% by mole or more, preferably 95% by mole or more, and especially preferably 97% by mole or more. When $R^C$ is an ethylene group, the effect for improving the dimensional stability against humidity changes and the effect for suppressing elongation at the time of processing can be more highly revealed.

Now, when the aromatic polyester (A') in the present invention is regarded as a polyester resin composition constituting the film layer (A'), it is preferable that its Tg (glass transition temperature) by DSC is 105° C. or higher in view of the matter that it is easy to satisfy tan δ as described later. A lower limit of the glass transition temperature of the aromatic polyester (A') is preferably 110° C. or higher, and more preferably 115° C. or higher. Though an upper limit thereof is not particularly limited, from the standpoint of film forming properties at the time of laminating with the film layer (B'), the lower limit is preferably not higher than 150° C., and more preferably not higher than 140° C.

From those standpoints, as a specific aromatic polyester, polyethylene-2,6-naphthalene dicarboxylate in which 95% by mole or more of the recurring unit (II') is composed of ethylene-2,6-naphthalene dicarboxylate is preferable. A material obtained by copolymerizing or blending a component capable of increasing Tg may also be used. Now, the aromatic polyester (A') may also be polyethylene terephthalate in which ethylene terephthalate is a main recurring unit. However, in the case of polyethylene terephthalate, different from the foregoing polyethylene-2,6-naphthalene dicarboxylate, in a homopolymer, the glass transition temperature easily becomes low. For that reason, it is preferable to copolymerize a component capable of increasing the glass transition temperature or to blend a polyether imide or a liquid crystal resin (see, for example, JP-A-2000-355631, JP-A-2000-141475, JP-A-11-1568, etc.).

In the aromatic polyester (A') in the present invention, from the standpoint of film forming properties, its melting point as measured by DSC is preferably 230 to 300° C., more preferably 240 to 290° C., and especially preferably 250 to 280° C.

<Multi-Layer Laminated Film>

From the viewpoint of more improving the dimensional stability against environmental changes, it is preferable to use the biaxially oriented multi-layer laminated film of the present invention by making it thicker than the film layer (B') composed of the aromatic polyester (B'). From such a viewpoint, in the biaxially oriented multi-layer film, a total thickness of the film layer (B') is preferably 30 to 80%, more preferably 35 to 75%, and still more preferably 40 to 70% relative to the thickness of the multi-layer laminated film. By making the total thickness of the film layer (B') fall within the foregoing range, the effect for improving the dimensional stability against humidity changes and the effect for suppressing elongation at the time of processing can be more highly revealed. When the total thickness of the film layer (B') is less than the lower limit, the effect for reducing the humidity expansion coefficient easily becomes poor, whereas when it exceeds the upper limit, the effect for suppressing elongation by the film layer (A) at the time of processing easily becomes poor.

Also, in the biaxially oriented multi-layer laminated film of the present invention, a proportion of the recurring unit (I') is preferably 3 to 40% by mole, more preferably 5 to 35% by mole, and still more preferably 7 to 30% by mole on the basis of a molar number of the recurring units occupying in the whole of the film of the film layers (A') and (B') in total. By making the proportion of the recurring unit (I') fall within the foregoing range, the dimensional stability against humidity changes is easily improved, and the effect for suppressing elongation at the time of processing can be more highly revealed. When the proportion of the recurring unit (I') is less than the lower limit, the effect for reducing the humidity expansion coefficient easily becomes poor. On the other hand, when it exceeds the upper limit, the effect for improving stretchability easily becomes poor, or when processed at high temperatures, elongation is easily generated.

In the present invention, a peak temperature of tan δ on the high-temperature side in the machine direction in measuring viscoelasticity of the biaxially oriented multi-layer laminated film is preferably 95° C. or higher, and more preferably 105° C. or higher. When the peak temperature is less than the lower limit, the effect for suppressing elongation at the time of processing at high temperatures is poor. The peak temperature is preferably 100 to 200° C., more preferably 110 to 200° C., and still more preferably 115 to 180° C. With respect to the peak temperature of tan δ, in general, a peak to be caused by the film layer (A') easily appears at the high-temperature side, and a peak to be caused by the film layer (B') easily appears at the low-temperature side. When such a peak temperature on the high-temperature side exists, elongation at the time of processing at high temperatures can be suppressed. Also, in order that such a peak temperature of tan δ on the high-temperature side by the film layer (A') may be revealed high, the adjustment can be achieved by selecting the polyester (A') and increasing the molecular orientation in the machine direction, namely stretching in a higher draw ratio.

As a matter of course, so far as the effects of the present invention are not impaired, other film layer may be laminated, or a coating film layer may be provided.

Now, in the biaxially oriented multi-layer laminated film of the present invention, a surface roughness (Ra) of the one of the surfaces thereof is preferably 1 nm to 20 nm, and more preferably 2 nm to 10 nm.

In general, in order to make the surface roughness of the film rough, inert particles may be incorporated into the film layer, or projections may be formed thereon. As the inert particles to be incorporated, the foregoing inert particles can be preferably exemplified.

From the viewpoint of running properties, an average particle size of the inert particles to be incorporated into the film layer is preferably 0.05 to 1.0 μm, and more preferably 0.1 to 0.8 μm. In particular, when used in a magnetic recording medium, the average particle size of the inert particles to be incorporated in the film layer is preferably 0.1 to 0.5 μm, and more preferably 0.1 to 0.3 μm. Also, a content of the inert particles to be incorporated in the film layer is preferably 0.005 to 1.0% by weight, and more preferably 0.01 to 0.5% by weight on the basis of the weight of the film layer. In this connection, it may be said that the same described above with respect to the biaxially oriented polyester film of the present invention is applicable to the biaxially oriented multi-layer laminated film of the present invention, unless otherwise especially indicated.

A preferred embodiment of the biaxially oriented multi-layer laminated film of the present invention is further described in detail.

In the biaxially oriented multi-layer laminated film of the present invention, in order that when used as a base film of a magnetic tape or the like, the base film may not elongate, it is preferable that at least one direction in the film plane direction has a high Young's modulus as 5.0 GPa or more. Moreover, by making the Young's modulus high, the humidity expansion coefficient can be made smaller. Though an upper limit of the Young's modulus is not limited, it is in general 11 GPa. The Young's modulus is preferably 3 to 11 GPa, more preferably 3 to 10 GPa, still more preferably 3.5 to 10 GPa, even yet still more preferably 3.5 to 9 GPa, especially preferably 4.0 to 9 GPa, and most preferably 4.0 to 8 GPa in the lengthwise direction of the film; and preferably 4 to 11 GPa, more preferably 5 to 11 GPa, still more preferably 5.5 to 11 GPa, yet still more preferably 6 to 10 GPa, and especially preferably 7 to 10 GPa in the width direction of the film, respectively.

Also, in the biaxially oriented multi-layer laminated film of the present invention, from the standpoint of revealing excellent dimensional stability, it is preferable that a temperature expansion coefficient ($\alpha$t) in at least one direction, and preferably in the width direction of the film is not more than 10 ppm/° C. When the temperature expansion coefficient in at least one direction of the film is not more than 10 ppm/° C., excellent dimensional stability against environmental changes can be revealed. Though a lower limit of the temperature expansion coefficient is not limited, it is in general −15 ppm/° C. The temperature expansion coefficient ($\alpha$t) is preferably −10 to 10 ppm/° C., more preferably −7 to 7 ppm/° C., and especially preferably −5 to 5 ppm/° C. This is because when formed into a magnetic recording tape, excellent dimensional stability against dimensional changes due to ambient temperature and humidity changes can be revealed.

In the biaxially oriented multi-layer laminated film of the present invention, a lower limit of a humidity expansion coefficient in at least one direction of the film in-plane direction is preferably 1 ppm/% RH, and more preferably 3 ppm/% RH; and an upper limit thereof is 8 ppm/% RH, more preferably 7 ppm/% RH, and especially preferably 6 ppm/% RH. In particular, from the standpoint of dimensional stability when formed into a magnetic recording tape, the humidity expansion coefficient is preferably 1 to 8 ppm/% RH, more preferably 3 to 8 ppm/% RH, and still more preferably 3 to 7 ppm/% RH. In particular, when used in a base film for a magnetic recording tape, it is preferable that the direction satisfying the foregoing humidity expansion coefficient is the width direction because a deviation of the track or the like can be extremely suppressed.

A thickness of the biaxially oriented multi-layer laminated film of the present invention may be properly determined depending upon an application, and when used in a base film for a magnetic recording tape, it is preferably 2 to 10 μm, more preferably 3 to 7 μm, and especially preferably 4 to 6 μm.

<Manufacturing Method of Biaxially Oriented Multi-Layer Laminated Film>

In the biaxially oriented multi-layer laminated film of the present invention, the same manufacturing method as the above-described manufacturing method of the biaxially oriented laminated polyester film can be adopted, unless otherwise especially indicated.

First, the aromatic polyesters (A') and (B') forming the film layers (A') and (B'), respectively are used as raw materials, dried and then laminated in a molten state within a die preferably at a temperature of a melting point (Tm: ° C.) of each polyester to (Tm+70)° C., followed by extrusion into a film form. Alternatively, each of the polyesters is extruded in a sheet form from a die, laminated and then quenched for solidification to form a laminated unstretched film, and the laminated unstretched film is further biaxially oriented.

The biaxial stretching may be either sequential biaxial stretching or simultaneous biaxial stretching.

Here, a manufacturing method of sequential biaxial stretching in which longitudinal stretching, lateral stretching and heat treatment are carried out in this order is described as an example. First, it is preferable that first longitudinal stretching is carried out to an extent of 3 to 10 times at a temperature of a glass transition temperature (Tg: ° C.) of either the aromatic polyester (A') or (B') which is higher to (Tg+40)° C.; stretching in the transverse direction is subsequently carried out to an extent of 3 to 10 times at a temperature higher than that of the preceding longitudinal stretching and ranging from (Tg+10) to (Tg+50)° C.; and as the heat treatment, a heat set treatment is carried out at a temperature not higher than a melting point of the polymer and ranging (Tg+50) to (Tg+150)° C. for 1 to 20 seconds. An especially preferred heat set treatment is carried out at a temperature of 180 to 220° C., and preferably 190 to 210° C. for a time of 1 to 15 seconds.

According to the present invention, by using the biaxially oriented multi-layer laminated film of the present invention as a base film, forming a nonmagnetic layer and a magnetic layer in this order on one surface thereof, and preferably on the surface on the flatter side and forming a backcoat layer on the other surface, and preferably on the surface on the non-flatter side, a magnetic recording tape can be provided.

EXAMPLES

The present invention is more specifically described below by reference to the following Examples and Comparative Examples. In this connection, in the present invention, the characteristics were measured and evaluated in the following methods.

(1) Intrinsic Viscosity:

An intrinsic viscosity of each of the obtained copolymerized aromatic polyesters and films was measured at 35° C. by dissolving the polymer in a mixed solvent of p-chlorophenol and tetrachloroethane (weight ratio: 40/60).

(2) Glass Transition Temperature and Melting Point:

A glass transition point and a melting point were measured by DSC (a trade name: Thermal Analyst 2100, manufactured by TA Instruments) at a temperature elevation rate of 20° C./min.

(3) Copolymerization Ratio:

With respect to an acid component, 50 mg of a sample was dissolved in 0.5 mL of a mixed solution of p-chlorophenol and heavy tetrachloroethane (volume ratio: 3/1) at 140° C., and an amount of the acid component was measured at 140° C. and at 400 MHz by $^{13}$C-NMR (JEOL A600, manufactured by Hitachi Electronics Services Co., Ltd.).

(4) Young's Modulus:

The obtained film was cut to a width of 10 mm and a length of 15 cm to obtain a sample, and the sample was pulled by a universal tensile tester (a trade name: Tensilon, Manufactured by Toyo Baldwin Co., Ltd.) at a chuck interval of 100 mm, a pulling rate of 10 mm/min and a chart rate of 500 mm/min. A Young's modulus was calculated from a tangent of a rising portion in the obtained load-elongation curve.

(5) Temperature Expansion Coefficient ($\alpha$t):

The obtained film was cut to a length of 15 mm and a width of 5 mm such that the machine direction and width direction of the film became the measurement direction, respectively. The sample was set in TMA3000, manufactured by ULVAC-RIKO, Inc., pretreated in a nitrogen atmosphere (0% RH) at 60° C. for 30 minutes and then cooled to room temperature. Thereafter, the sample was heated from 25° C. to 70° C. at a temperature elevation rate of 2° C./min, thereby measuring a length of the sample at each temperature. Subsequently, a temperature expansion coefficient ($\alpha$t) was calculated according to the following expression. In this connection, the measurement direction was the lengthwise direction of the cut sample; and the measurement was carried out 5 times, and an average value thereof was used.

$$\alpha t = \{(L_{60} - L_{40})/(L_{40} \times \Delta T)\} + 0.5$$

Here, in the foregoing expression, $L_{40}$ is a length (mm) of the sample at 40° C.; $L_{60}$ is a length (mm) of the sample at 60° C.; ΔT is 20 (=60−40)° C.; and 0.5 is a temperature expansion coefficient (ppm/° C.) of quartz glass.

(6) Humidity Expansion Coefficient (αh):

The obtained film was cut to a length of 15 mm and a width of 5 mm such that the machine direction and width direction of the film became the measurement direction, respectively. The sample was set in TMA3000, manufactured by ULVAC-RIKO, Inc., thereby measuring a length of the sample at a humidity of 30% RH and 70% RH, respectively in a nitrogen atmosphere at 30° C. Subsequently, a humidity expansion coefficient was calculated according to the following expression. In this connection, the measurement direction was the lengthwise direction of the cut sample; and the measurement was carried out 5 times, and an average value thereof was designated as αh (ppm/% RH).

$$\alpha h = (L_{70} - L_{30})/(L_{30} \times \Delta H)$$

Here, in the foregoing expression, $L_{30}$ is a length (mm) of the sample at 30% RH; $L_{70}$ is a length (mm) of the sample at 70% RH; and ΔH is 40 (=70−30) % RH.

(7) Central Surface Average Roughness (Ra):

A surface roughness was measured using a non-contact type three-dimensional surface structural analytic microscope (New View 5022, manufactured by Zygo Corporation) under a condition of a measurement magnification of 25 times and a measurement area of 283 μm×213 μm (=0.0603 mm²), and a central surface average roughness Ra was determined by a surface analysis software built in the roughness meter according to the following expression.

$$Ra = \sum_{k=1}^{M} \sum_{j=1}^{N} |Z_{jk} - \overline{Z}|/(M \cdot N)$$

wherein $$\overline{Z} = \sum_{k=1}^{M} \sum_{j=1}^{N} Z_{jk}/(M \cdot N)$$

Here, $Z_{jk}$ is a height on a two-dimensional roughness chart at the j-th and k-th positions in the respective directions obtained by dividing the measurement direction (283 μm) and the orthogonal direction thereto (213 μm) M times and N times, respectively.

(8) Winding Properties:

A film roll wound up at the time of winding 8,000 m in a size of 1,000 mm in a slit width at a slit rate of 60 m/min was observed, and winding properties were evaluated according to the following criteria.

Good: Wrinkles are not found.

Fair: Wrinkles are slightly found, a level of which is, however, not problematic for the practical use.

Bad: A large number of wrinkles are generated.

(9) Electromagnetic Conversion Characteristics:

For the measurement of electromagnetic conversion characteristics, a head-fixed ½-inch linear system was used. For recording, an electromagnetic induction type head (track width: 25 μm, gap: 0.1 μm) was used; and for regeneration, an MR head (8 μm) was used. A relative speed of head/tape was set at 10 m/sec; signals at a recording wavelength of 0.2 μm were recorded; the regenerative signals were subjected to frequency analysis by a spectrum analyzer; a ratio of an output C of a carrier signal (wavelength: 0.2 μm) to an integrated noise N of a full spectrum region was defined as a C/N ratio; and a relative value was determined while defining a value of Example 1 as 0 dB and evaluated according to the following criteria.

Good: +1 dB or more

Fair: −1 dB or more and less than +1 dB

Bad: Less than −1 dB

In this connection, a magnetic recording tape to be provided for the measurement of electromagnetic conversion characteristics was fabricated in the following manner.

First, a backcoat layer coating material having the following composition was coated on one of the surfaces of the film obtained in each of the Examples and Comparative Examples (the surface of the film layer B in the case of a laminated film) by a die coater; and after drying, a nonmagnetic coating material and a magnetic coating material having the following compositions, respectively were simultaneously coated on the other surface of the film (the surface of the film layer A in the case of a laminated film) by a die coater while changing the film thickness and magnetically oriented, followed by drying. Furthermore, the resulting film was subjected to a calender treatment by a small-sized test calender apparatus (steel roll/nylon roll, five stages) at a temperature of 70° C. and at a linear pressure of 200 kg/cm and then cured at 70° C. for 48 hours. The resulting tape was slit into 12.65 mm and inserted in a cassette, thereby fabricating a magnetic recording tape. The thicknesses of the backcoat layer, the nonmagnetic layer and the magnetic layer after drying were 0.5 μm, 1.2 μm and 0.1 μm, respectively.

<Composition of Nonmagnetic Coating Material>

Titanium dioxide fine particle: 100 parts by weight

S-Lec A (vinyl chloride/vinyl acetate copolymer, manufactured by Sekisui Chemical Co., Ltd.): 10 parts by weight Nippolane 2304 (polyurethane elastomer, manufactured by Nippon Polyurethane Industry Co., Ltd.): 10 parts by weight Coronate L (polyisocyanate, manufactured by Nippon Polyurethane Industry Co., Ltd.): 5 parts by weight Lecithin: 1 part by weight Methyl ethyl ketone: 75 parts by weight Methyl isobutyl ketone: 75 parts by weight Toluene: 75 parts by weight Carbon black: 2 parts by weight Lauric acid: 1.5 parts by weight <Composition of Magnetic Coating Material>

Iron (length: 0.3 μm, acicular ratio: 10/1, 1800 oersteds): 100 parts by weight

S-Lec A (vinyl chloride/vinyl acetate copolymer, manufactured by Sekisui Chemical Co., Ltd.): 10 parts by weight Nippolane 2304 (polyurethane elastomer, manufactured by Nippon Polyurethane Industry Co., Ltd.): 10 parts by weight Coronate L (polyisocyanate, manufactured by Nippon Polyurethane Industry Co., Ltd.): 5 parts by weight Lecithin: 1 part by weight Methyl ethyl ketone: 75 parts by weight Methyl isobutyl ketone: 75 parts by weight Toluene: 75 parts by weight Carbon black: 2 parts by weight Lauric acid: 1.5 parts by weight <Composition of Coating Material for Backcoat Layer>

Carbon black: 100 parts by weight

Thermoplastic polyurethane resin: 60 parts by weight

Isocyanate compound (Coronate L, manufactured by Nippon Polyurethane Industry Co., Ltd.): 18 parts by weight Silicone oil: 0.5 parts by weight Methyl ethyl ketone: 250 parts by weight Toluene: 50 parts by weight

(10) Thicknesses of Laminated Film and Film Layer:

Ten laminated films were joined together while removing air between adjacent layers to measure the thickness of the resulting laminate by using a MDC-25S dial gauge, manufactured by Mitutoyo Corporation in accordance with the 10 films lamination method specified in JIS C2151, thereby calculating a film thickness per laminated film. This measurement was repeated 10 times, and an average value thereof was regarded as a thickness of the whole of the laminated film.

Meanwhile, as for the thicknesses of the film layer A and the film layer B, or the film layer (A') and the film layer (B'), a film piece was fixed and shaped by an epoxy resin, and cut into a super thin piece having a thickness of about 60 nm (cut in parallel with the machine direction and the thickness direction of the film) by a microtome. This super thin film sample was observed through a transmission electron microscope (Model H-800, manufactured by Hitachi, Ltd.). When the film layer A and the film layer B, or the film layer (A') and the film layer (B'), were different in polymer from each other, and the boundary between the film layer A and the film layer B, or between the film layer (A') and the film layer (B'), could be observed, the thicknesses of the film layers A and B, or the film layer (A') and the film layer (B'), were determined from the boundary; and when the polymers of the film layer A and the film layer B, or the film layer (A') and the film layer (B'), were the same, so that the boundary could not be observed, 100 positions of thickness where the amount of the inert particles changed were determined from each of the surface sides, thereby determining the thicknesses of the layer A and the layer B, or the film layer (A') and the film layer (B'), from average values thereof.

(11) Productivity of Film:

The productivity of film was evaluated from a recoverability rate of recovered chips to be incorporated into the film B layer according to the following criteria.

Good: 60% or more
Fair: 40% or more and less than 60%
Bad: less than 40%

(12) Coating Ununiformity by Elongation at the Time of Processing:

A film having a length of 500 m was prepared by slitting the film to a width of 500 mm, a nonmagnetic coating material and a magnetic coating material having the compositions used in the measurement of electromagnetic conversion characteristics as set forth above in (9), respectively were simultaneously coated to one the surfaces of the film under a tension condition of 20 MPa by a die coater so as to form a nonmagnetic layer having a thickness of 1.2 μm and a magnetic layer having a thickness of 0.1 μm after drying while changing the film thickness, and then magnetically oriented and dried under a condition of 120° C.×30 seconds. Furthermore, the obtained film was subjected to a calender treatment by a small-sized test calender apparatus (steel rolls/nylon rolls, five stages) at a temperature of 70° C. and at a linear pressure of 200 kg/cm and then cured at 70° C. for 48 hours. The coating ununiformity of the obtained magnetic layer-provided film was evaluated by visual inspection according to the following criteria. In this connection, the visual inspection was carried out by installing a fluorescent lamp on the rear side of the film and counting the number of light leakages through deletion of the magnetic layer. A magnetic recording tape can be fabricated by forming a backcoat layer on the magnetic layer-provided film depending upon the needs, slitting it into a width of 12.65 mm and inserting the obtained film in a cassette.

Good: The number of coating deletions is less than 2/250 m$^2$.

Fair: The number of coating deletions is 2/250 m$^2$ or more and less than 10/250 m$^2$.

Bad: The number of coating deletions is 10/250 m$^2$ or more.

(13) Measurement of Viscoelasticity:

A film sample was cut to a length of 35 mm in the machine direction (MD) of the film and a width of 3 mm in the width direction (TD). The temperature was then increased from room temperature to 200° C. at a rate of 5° C./min under a load of 3 g at a frequency of 1 Hz by using a Vibron apparatus, manufactured by Orientec Co., Ltd., thereby measuring its viscoelasticity in the MD direction. A peak temperature and a peak intensity of tan δ were determined from the obtained chart.

(14) Curl:

A film sample was cut to a length of 250 mm in the machine direction (MD) of the film and a width of 100 mm in the width direction (TD) and treated at 120° C. for 1 minute under a load of 20 MPa, thereby evaluating a degree of curl according to the following criteria.

Good: No curl
Fair: Curled to an extent that only four corners of the film sample are slightly turned up.
Bad: Curled to an extent that the film sample rolls up in a cylindrical shape.

Example 1

A transesterification reaction between dimethyl 4,4'-(ethylenedioxy)bisbenzoate and ethylene glycol was carried out in the presence of titanium tetrabutoxide, and subsequently, a polycondensation reaction was carried out to obtain an aromatic polyester a having an intrinsic viscosity of 0.71 dL/g. This aromatic polyester had a melting point of 243° C. and a glass transition temperature of 74° C.

Meanwhile, a transesterification reaction between dimethyl 2,6-naphthalene dicarboxylate and ethylene glycol was carried out in the presence of titanium tetrabutoxide, and subsequently, a polycondensation reaction was carried out to obtain an aromatic polyester b having an intrinsic viscosity of 0.62 dL/g. This polyethylene-2,6-naphtalate had a melting point of 265° C. and a glass transition temperature of 120° C.

Furthermore, similar to the polyester b, a transesterification reaction between dimethyl 2,6-naphthalene dicarboxylate and ethylene glycol in the presence of titanium tetrabutoxide, and thereafter, silica particles having an average particle size of 0.5 μm were incorporated in an amount of 1.5% by weight on the basis of the weight of the obtained resin composition, thereby obtaining an aromatic polyester c having an intrinsic viscosity of 0.60 dL/g.

Each of the thus obtained aromatic polyesters a, b and c was supplied into an extruder such that 75% by mole of the acid component was the 4,4'-(ethylenedioxy)bisbenzoic acid component and that the amount of the silica particles having an average particle size of 0.5 μm was 0.2% by weight on the basis of the weight of the obtained resin composition, and a mixture was extruded in a molten state into a sheet form from a die at 290° C. onto a rotating cooling drum at a temperature of 40° C., thereby forming an unstretched film. The film was then heated by an IR heater from the upper portion between two pairs of rollers having a different rotating speed from each other along the machine direction such that the surface temperature of the film was 100° C. and stretched in a draw ratio of 4.0 times in the longitudinal direction (machine direction), thereby obtaining a monoaxially oriented film. This monoaxially oriented film was guided into a stenter, stretched in a draw ratio of 4.5 times in the transverse direction (width direction) at 110° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Example 2

Each of the aromatic polyesters a, b and c obtained in the same manner as in Example 1 was supplied into an extruder such that 75% by mole of the acid component was the 4,4'-(ethylenedioxy)bisbenzoic acid component and that the amount of the silica particles having an average particle size of 0.5 μm was 0.2% by weight on the basis of the weight of the obtained resin composition, and a mixture was extruded in a molten state into a sheet form from a die at 290° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 105° C. and stretched in a draw ratio of 5.0 times in the longitudinal direction (machine direction), thereby obtaining a monoaxially oriented film. This monoaxially oriented film was guided into a stenter, stretched in a draw ratio of 5.0 times in the transverse direction (width direction) at 115° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Example 3

Each of the aromatic polyesters a, b and c obtained in the same manner as in Example 1 was supplied into an extruder such that 65% by mole of the acid component was the 4,4'-(ethylenedioxy)bisbenzoic acid component and that the amount of the silica particles having an average particle size of 0.5 μm was 0.2% by weight on the basis of the weight of the obtained resin composition, and a mixture was extruded in a molten state into a sheet form from a die at 290° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 105° C. and stretched in a draw ratio of 4.5 times in the longitudinal direction (machine direction), thereby obtaining a monoaxially oriented film. This monoaxially oriented film was guided into a stenter, stretched in a draw ratio of 5.0 times in the transverse direction (width direction) at 115° C. and then subjected to a heat set treatment at 180° C. for 3 seconds, thereby obtaining a biaxially oriented film having a thickness of 10 μm.

Characteristics of the obtained biaxially oriented polyester film are shown in Table 1.

Example 4

Each of the aromatic polyesters a, b and c obtained in the same manner as in Example 1 was supplied into an extruder such that 30% by mole of the acid component was the 4,4'-(ethylenedioxy)bisbenzoic acid component and that the amount of the silica particles having an average particle size of 0.5 μm was 0.2% by weight on the basis of the weight of the obtained resin composition, and a mixture was extruded in a molten state into a sheet form from a die at 290° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 110° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 120° C. and then subjected to a heat set treatment at 210° C. for 5 seconds, thereby obtaining a biaxially oriented film having a thickness of 10 μm.

Characteristics of the obtained biaxially oriented polyester film are shown in Table 1.

Example 5

A transesterification reaction among dimethyl 4,4'-(ethylenedioxy)bisbenzoate, dimethyl 2,6-naphthalene dicarboxylate and ethylene glycol was carried out in the presence of titanium tetrabutoxide, and subsequently, a polycondensation reaction was carried out to obtain an aromatic polyester having an intrinsic viscosity of 0.69 dL/g and having, as the acid component, 85% by mole of the 4,4'-(ethylenedioxy)bisbenzoic acid component and 15% by mole of the 2,6-naphthalene dicarboxylic acid component. In this connection, prior to the polycondensation reaction, the aromatic polyester was incorporated with silica particles having an average particle size of 0.5 μm in an amount of 0.2% by weight on the basis of the weight of the obtained resin composition. This aromatic polyester had a melting point of 223° C. and a glass transition temperature of 77° C.

The thus obtained aromatic polyester was supplied into an extruder and extruded in a molten state into a sheet form from a die at 260° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 90° C. and stretched in a draw ratio of 4.0 times in the longitudinal direction (machine direction), thereby obtaining a monoaxially oriented film. This monoaxially oriented film was guided into a stenter, stretched in a draw ratio of 4.5 times in the transverse direction (width direction) at 95° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Example 6

A transesterification reaction among dimethyl 4,4'-(ethylenedioxy)bisbenzoate, dimethyl terephthalate and ethylene glycol was carried out in the presence of titanium tetrabutoxide, and subsequently, a polycondensation reaction was carried out to obtain an aromatic polyester having an intrinsic viscosity of 0.65 dL/g and having, as the acid component, 85% by mole of the 4,4'-(ethylenedioxy)bisbenzoic acid component and 15% by mole of the terephthalic acid component. In this connection, prior to the polycondensation reaction, the aromatic polyester was incorporated with silica particles having an average particle size of 0.5 μm in an amount of 0.2% by weight on the basis of the weight of the obtained resin composition. This aromatic polyester had a melting point of 226° C. and a glass transition temperature of 74° C.

The thus obtained aromatic polyester was supplied into an extruder and extruded in a molten state into a sheet form from a die at 260° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 90° C. and stretched in a draw ratio of 3.0 times in the longitudinal direction (machine direction), thereby obtaining a monoaxially oriented film. This monoaxially oriented film was guided into a stenter, stretched in a draw ratio of 5.5 times in the transverse direction (width direction) at 95° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Example 7

A transesterification reaction among dimethyl 4,4'-(ethylenedioxy)bisbenzoate, dimethyl terephthalate and ethylene glycol was carried out in the presence of titanium tetrabutoxide, and subsequently, a polycondensation reaction was carried out to obtain an aromatic polyester a having an intrinsic viscosity of 0.64 dL/g and having, as the acid component, 70% by mole of the 4,4'-(ethylenedioxy)bisbenzoic acid component and 30% by mole of the terephthalic acid component. In this connection, prior to the polycondensation reaction, the aromatic polyester was incorporated with silica particles having an average particle size of 0.5 μm in an amount of 0.2% by weight on the basis of the weight of the obtained resin composition. This aromatic polyester had a melting point of 200° C. and a glass transition temperature of 73° C.

The thus obtained aromatic polyester was supplied into an extruder and extruded in a molten state into a sheet form from a die at 260° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 90° C. and stretched in a draw ratio of 3.0 times in the longitudinal direction (machine direction), thereby obtaining a monoaxially oriented film. This monoaxially oriented film was guided into a stenter, stretched in a draw ratio of 5.5 times in the transverse direction (width direction) at 95° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Example 8

A transesterification reaction among dimethyl 4,4'-(ethylenedioxy)bisbenzoate, dimethyl terephthalate and ethylene glycol was carried out in the presence of titanium tetrabutoxide, and subsequently, a polycondensation reaction was carried out to obtain an aromatic polyester a having an intrinsic viscosity of 0.64 dL/g and having, as the acid component, 10% by mole of the 4,4'-(ethylenedioxy)bisbenzoic acid component and 90% by mole of the terephthalic acid component. In this connection, prior to the polycondensation reaction, the aromatic polyester was incorporated with silica particles having an average particle size of 0.5 μm in an amount of 0.2% by weight on the basis of the weight of the obtained resin composition. This aromatic polyester had a melting point of 226° C. and a glass transition temperature of 76° C.

The thus obtained aromatic polyester was supplied into an extruder and extruded in a molten state into a sheet form from a die at 260° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 90° C. and stretched in a draw ratio of 3.0 times in the longitudinal direction (machine direction), thereby obtaining a monoaxially oriented film. This monoaxially oriented film was guided into a stenter, stretched in a draw ratio of 5.5 times in the transverse direction (width direction) at 95° C. and then subjected to a heat set treatment at 190° C. for 3 seconds, thereby obtaining a biaxially oriented film having a thickness of 10 μm.

Characteristics of the obtained biaxially oriented polyester film are shown in Table 1.

Comparative Example 1

An esterification reaction and a transesterification reaction between dimethyl 2,6-naphthalene dicarboxylate and ethylene glycol were carried out in the presence of titanium tetrabutoxide, and subsequently, a polycondensation reaction was carried out to obtain polyethylene-2,6-naphthalate having an intrinsic viscosity of 0.62 dL/g. In this connection, prior to the polycondensation reaction, the polyethylene-2,6-naphthalate was incorporated with silica particles having an average particle size of 0.5 μm in an amount of 0.2% by weight on the basis of the weight of the obtained resin composition. This polyethylene-2,6-naphthalate had a melting point of 265° C. and a glass transition temperature of 120° C.

The thus obtained polyethylene-2,6-naphthalate was supplied into an extruder and extruded in a molten state into a sheet form from a die at 300° C. onto a rotating cooling drum at a temperature of 60° C., thereby forming an unstretched film. The film was then heated by an IR heater from the upper portion between two pairs of rollers having a different rotating speed from each other along the machine direction such that the surface temperature of the film was 140° C. and stretched in a draw ratio of 3.0 times in the longitudinal direction (machine direction), thereby obtaining a monoaxially oriented film. This monoaxially oriented film was guided into a stenter, stretched in a draw ratio of 4.3 times in the transverse direction (width direction) at 140° C. and then subjected to a heat set treatment at 200° C. for 10 seconds, thereby obtaining a biaxially oriented film having a thickness of 10 μm.

Characteristics of the obtained biaxially oriented polyester film are shown in Table 1.

Comparative Example 2

A biaxially oriented film having a thickness of 10 μm was obtained in the same manner as in Comparative Example 1, except for changing the stretching temperature in the machine direction to 140° C., changing the draw ratio in the machine direction to 4.0 times, changing the stretching temperature in the width direction to 140° C., changing the draw ratio in the width direction to 4.0 times and changing the heat set treatment temperature to 200° C., respectively.

Characteristics of the obtained biaxially oriented polyester film are shown in Table 1.

Comparative Example 3

An esterification reaction and a transesterification reaction between dimethyl 4,4'-(ethylenedioxy)bisbenzoate and ethylene glycol were carried out in the presence of titanium tetrabutoxide, and subsequently, a polycondensation reaction was carried out to obtain polyethylene-1,2-diphenoxyethane-4,4'-dicarboxylate having an intrinsic viscosity of 0.72 dL/g. In this connection, prior to the polycondensation reaction, the polyethylene-1,2-diphenoxyethane-4,4'-dicarboxylate was incorporated with silica particles having an average particle size of 0.5 μm in an amount of 0.2% by weight on the basis of the weight of the obtained resin composition.

This polyethylene-1,2-diphenoxyethane-4,4'-dicarboxylate had a melting point of 243° C. and a glass transition temperature of 74° C.

The thus obtained polyethylene-1,2-diphenoxyethane-4,4'-dicarboxylate was supplied into an extruder and extruded in a molten state into a sheet form from a die at 280° C. onto a rotating cooling drum at a temperature of 40° C., thereby forming an unstretched film. The film was then heated by an IR heater from the upper portion between two pairs of rollers having a different rotating speed from each other along the machine direction such that the surface temperature of the film was 80° C. and stretched in a draw ratio of 3.0 times in the longitudinal direction (machine direction). As a result, crystallization excessively proceeded, the film became white, and further stretching in the transverse direction could not be carried out.

Comparative Example 4

An esterification reaction and a transesterification reaction between dimethyl terephthalate and ethylene glycol were carried out in the presence of titanium tetrabutoxide, and subsequently, a polycondensation reaction was carried out to obtain polyethylene terephthalate having an intrinsic viscosity of 0.63 dL/g. In this connection, prior to the polycondensation reaction, the polyethylene terephthalate was incorporated with silica particles having an average particle size of 0.5 μm in an amount of 0.2% by weight on the basis of the weight of the obtained resin composition. This polyethylene terephthalate had a melting point of 254° C. and a glass transition temperature of 78° C.

The thus obtained polyethylene terephthalate was supplied into an extruder and extruded in a molten state into a sheet form from a die at 280° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 100° C. and stretched in a draw ratio of 3.0 times in the longitudinal direction (machine direction), thereby obtaining a monoaxially oriented film. This monoaxially oriented film was guided into a stenter, stretched in a draw ratio of 5.0 times in the transverse direction (width direction) at 110° C. and then subjected to a heat set treatment at 200° C. for 10 seconds, thereby obtaining a biaxially oriented film having a thickness of 10 μm.

Characteristics of the obtained biaxially oriented polyester film are shown in Table 1.

TABLE 1

| | Acid component Kind (% by mole) | Intrinsic viscosity (dL/g) | Melting point (° C.) | Glass transition temperature (° C.) | Young's modulus MD (GPa) | Young's modulus TD (GPa) | Humidity expansion coefficient ($\alpha h$) MD ($\times 10^{-6}$/% RH) | Humidity expansion coefficient ($\alpha h$) TD ($\times 10^{-6}$/% RH) | Temperature expansion coefficient ($\alpha t$) MD ($\times 10^{-6}$/° C.) | Temperature expansion coefficient ($\alpha t$) TD ($\times 10^{-6}$/° C.) |
|---|---|---|---|---|---|---|---|---|---|---|
| Example 1 | EBA(75)/NA(25) | 0.61 | 226 | 77 | 4.0 | 6.3 | 6.9 | 5.9 | 13.6 | 3.1 |
| Example 2 | EBA(75)/NA(25) | 0.61 | 226 | 77 | 4.9 | 5.8 | 5.4 | 5.9 | 10.8 | 4.6 |
| Example 3 | EBA(65)/NA(35) | 0.61 | 219 | 85 | 4.5 | 6.2 | 5.5 | 5.3 | 11.1 | 9.5 |
| Example 4 | EBA(30)/NA(70) | 0.61 | 240 | 100 | 4.3 | 7.0 | 8.7 | 6.7 | 12.1 | −1.0 |
| Example 5 | EBA(85)/NA(15) | 0.60 | 223 | 77 | 3.0 | 7.1 | 6.3 | 4.7 | 19.4 | 3.5 |
| Example 6 | EBA(85)/TA(15) | 0.62 | 226 | 74 | 3.5 | 6.6 | 9.4 | 5.0 | 21.3 | 0.5 |
| Example 7 | EBA(70)/TA(30) | 0.61 | 200 | 73 | 3.3 | 6.2 | 9.9 | 5.2 | 16.6 | 4.2 |
| Example 8 | EBA(10)/TA(90) | 0.61 | 226 | 76 | 3.5 | 8.0 | 9.3 | 5.9 | 20.9 | 5.1 |
| Comparative Example 1 | NA(100) | 0.58 | 266 | 120 | 5.5 | 9.5 | 13.5 | 8.6 | 14.6 | −3.8 |
| Comparative Example 2 | NA(100) | 0.58 | 266 | 120 | 7.1 | 7.3 | 11.5 | 10.5 | 7.1 | 4.5 |
| Comparative Example 3 | EBA(100) | 0.62 | 243 | 74 | — | — | — | — | — | — |
| Comparative Example 4 | TA(100) | 0.60 | 254 | 78 | 4.0 | 7.8 | 14.4 | 7.7 | 25.9 | 3.9 |

In Table 1, NA represents a 2,6-naphthalene dicarboxylic acid component; EBA represents a 4,4'-(ethylenedioxy)bisbenzoic acid component; TA represents a terephthalic acid component; each of the intrinsic viscosity, the melting point and the glass transition temperature is a value of the copolymerized aromatic polyester in a state of the film; MD represents the machine direction of the film; and TD represents the width direction of the film.

Example 9

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-1) for film layer A having an intrinsic viscosity of 0.61 dL/g, having, as the acid component, 70% by mole of the 2,6-naphthalene dicarboxylic acid component and 30% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight on the basis of the weight of the obtained resin composition. This aromatic polyester (A-1) had a melting point of 240° C. and a glass transition temperature of 100° C. Also, an aromatic polyester (B-1) for film layer B was obtained in the same manner as in the foregoing (A-1), except for incorporating 0.15% by weight of silica particles having an average particle size of 0.3 μm and 0.1% by weight of silica particles having an average particle size of 0.1 μm. This aromatic polyester (B-1) had a melting point of 240° C. and a glass transition temperature of 100° C. The thus obtained aromatic polyesters (A-1) and (B-1) were respectively supplied into different extruders and laminated at 290° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 110° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 120° C. and then subjected to a heat set treatment at 210° C. for 5 seconds, thereby obtaining a biaxially oriented laminated polyester film having a thickness of 10 μm. Characteristics of the obtained biaxially oriented laminated polyester film are shown in Table 2.

Example 10

An aromatic polyester (A-2) was manufactured by repeating the same operations as those in the aromatic polyester (A-1), except that in Example 9, the inert particles to be incorporated were changed to silica particles having an average particle size of 0.15 μm and that the content thereof was changed to 0.2% by weight. Also, an aromatic polyester (B-2) was manufactured by repeating the same operations as those in the aromatic polyester (B-1), except that in Example 9, the inert particles to be incorporated were changed to silicone particles having an average particle size of 0.5 μm and silica particles having an average particle size of 0.15 μm and that the contents of these particles were changed to 0.02% by weight and 0.2% by weight, respectively. A biaxially oriented laminated polyester film was obtained by repeating the same operations as in Example 9, except that the thus obtained aromatic polyesters (A-2) and (B-2) were used for the film layer A and the film layer B, respectively and supplied into different extruders and laminated at 290° C. in a thickness ratio of 1/1 within a die; and that the laminate was extruded in a molten state into a sheet form onto a rotating cooling drum at a temperature of 30° C., thereby forming an unstretched laminated film. Characteristics of the obtained biaxially oriented laminated polyester film are shown in Table 2.

Example 11

An aromatic polyester (A-3) and an aromatic polyester (B-3) were obtained in the same manner as in Example 9, except that a material obtained by changing the inert particles of the aromatic polyester (A-1) to 0.3% by weight of silica particles having an average particle size of 0.05 μm was used as the aromatic polyester (A-3) for film layer A; and that a material obtained by changing the inert particles of the aromatic polyester (B-1) to 0.2% by weight of silica particles having an average particle size of 0.2 μm and 0.3% by weight of silica particles having an average particle size of 0.05 μm was used as the aromatic polyester (B-3) for film layer B. A biaxially oriented laminated polyester film was obtained by repeating the same operations as in Example 9, except that the thus obtained aromatic polyesters (A-3) and (B-3) were respectively supplied into different extruders and laminated at 290° C. in a thickness ratio of 1/4 within a die; and that the laminate was extruded in a molten state into a sheet form onto a rotating cooling drum at a temperature of 30° C., thereby forming an unstretched laminated film. Characteristics of the obtained biaxially oriented laminated polyester film are shown in Table 2.

Example 12

An aromatic polyester (A-4) and an aromatic polyester (B-4) were obtained in the same manner as in Example 9, except that a material obtained by changing the inert particles of the aromatic polyester (A-1) to 0.2% by weight of alumina particles having an average particle size (primary particle size) of 0.06 μm was used as the aromatic polyester (A-4) for film layer A; and that a material obtained by changing the inert particles of the aromatic polyester (B-1) to 0.15% by weight of crosslinked polystyrene particles having an average particle size of 0.3 μm and 0.2% by weight of alumina particles having an average particle size (primary particle size) of 0.06 μm was used as the aromatic polyester (B-4) for film layer B. A biaxially oriented laminated polyester film was obtained by repeating the same operations as in Example 9, except that the thus obtained aromatic polyesters (A-4) and (B-4) were respectively supplied into different extruders and laminated at 290° C. in a thickness ratio of 1/2 within a die; and that the laminate was extruded in a molten state into a sheet form onto a rotating cooling drum at a temperature of 30° C., thereby forming an unstretched laminated film. Characteristics of the obtained biaxially oriented laminated polyester film are shown in Table 2.

Example 13

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-5) for film layer A having an intrinsic viscosity of 0.61 dL/g, having, as the acid component, 90% by mole of the 2,6-naphthalene dicarboxylic acid component and 10% by mole of the 4,4'-(ethylenedioxy)bisbenzoic acid component and having, as the glycol component, 99% by mole of the ethylene glycol component and 1% by mole of the diethylene glycol component. In this connection, prior to the polycondensation reaction, the aromatic polyester (A-5) was incorporated with silica particles having an average particle size of 0.1 μm in an amount of 0.1% by weight on the basis of the weight of the obtained resin composition. This aromatic polyester (A-5) had a melting point of 254° C. and a glass transition temperature of 112° C. Also, an aromatic polyester (B-5) for film layer B was obtained in the same manner as in the foregoing aromatic polyester (A-5), except for changing the inert particles to 0.15% by weight of silica particles having an average particle size of 0.3 μm and 0.1% by weight of silica particles having an average particle size of 0.1 μm. This aromatic polyester (B-5) had a melting point of 254° C. and a glass transition temperature of 112° C. The thus obtained aromatic polyesters were formed into an unstretched laminated film in the same manner as in Example 9. The film was then heated by an IR heater from the upper portion between two pairs of rollers having a different rotating speed from each other along the machine direction such that the surface temperature of the film was 125° C. and stretched in a draw ratio of 4.0 times in the longitudinal direction (machine direction). This monoaxially oriented film was guided into a stenter, stretched in a draw ratio of 5.0 times in the transverse direction (width direction) at 135° C. and then subjected to a heat set treatment at 210° C. for 5 seconds, thereby obtaining a biaxially oriented laminated polyester film having a thickness of 10 μm. Characteristics of the obtained biaxially oriented laminated polyester film are shown in Table 2.

Example 14

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-6) for film layer A having an intrinsic viscosity of 0.61 dL/g, having, as the acid component, 25% by mole of the 2,6-naphthalene dicarboxylic acid component and 75% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester (A-6) was incorporated with silica particles having an average particle size of 0.1 μm in an amount of 0.1% by weight on the basis of the weight of the obtained resin composition. This aromatic polyester (A-6) had a melting point of 226° C. and a glass transition temperature of 77° C. Also, an aromatic polyester (B-6) for film layer B was obtained in the same manner as in the aromatic polyester (A-6), except for changing the inert particles to 0.15% by weight of silica particles having an average particle size of 0.3 μm and 0.1% by weight of silica particles having an average particle size of 0.1 μm. This aromatic polyester (B-6) had a melting point of 226° C. and a glass transition temperature of 77° C. Each of the thus obtained aromatic polyesters was supplied into an extruder and extruded in a molten state into a sheet form from a die at 290° C. onto a rotating cooling drum at a temperature of 30° C., thereby forming an unstretched film. The film was then heated by an IR heater from the upper portion between two pairs of rollers having a different rotating speed from each other along the machine direction such that the surface temperature of the film was 105° C. and stretched in a draw ratio of 4.0 times in the longitudinal direction (machine direction), thereby obtaining a monoaxially oriented film. This monoaxially oriented film was guided into a stenter, stretched in a draw ratio of 4.5 times in the transverse direction (width direction) at 120° C. and then subjected to a heat set treatment at 210° C. for 5 seconds to adjust a thickness of the unstretched film, thereby obtaining a biaxially oriented laminated polyester film having a thickness of 10 μm. Characteristics of the obtained biaxially oriented laminated polyester film are shown in Table 2.

Example 15

A biaxially oriented laminated polyester film was obtained in the same manner as in Example 9, except for changing the thickness ratio (A/B) of the film layer A to the film layer B to 2/1. Characteristics of the obtained biaxially oriented laminated polyester film are shown in Table 2.

Example 16

The same operations as those in Example 9 were repeated, except for changing the polyethylene-2,6-naphthalene dicarboxylate (A-1) for film layer A to A-7 of Example 22 as described later. Characteristics of the obtained biaxially oriented laminated polyester film are shown in Table 2.

Example 17

The same operations as those in Example 15 were repeated, except for changing the polyethylene-2,6-naphthalene dicarboxylate (B-1) for film layer B to B-7 of Comparative Example 5 as described later. Characteristics of the obtained biaxially oriented laminated polyester film are shown in Table 2.

Example 18

An esterification reaction and a transesterification reaction among dimethyl terephthalate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-10) for film layer A having an intrinsic viscosity of 0.61 dL/g, having, as the acid component, 30% by mole of the terephthalic acid component and 70% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight on the basis of the weight of the obtained resin composition. This aromatic polyester (A-10) had a melting point of 200° C. and a glass transition temperature of 73° C. Also, an aromatic polyester (B-8) for film layer B was obtained in the same manner as in the foregoing (A-10), except for incorporating 0.15% by weight of silica particles having an average particle size of 0.3 μm and 0.1% by weight of silica particles having an average particle size of 0.1 μm. This aromatic polyester (B-8) had a melting point of 200° C. and a glass transition temperature of 73° C. The thus obtained aromatic polyesters (A-10) and (B-8) were respectively supplied into different extruders and laminated at 280° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 100° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 110° C. and then subjected to a heat set treatment at 160° C. for 5 seconds, thereby obtaining a biaxially oriented laminated polyester film having a thickness of 10 μm. Characteristics of the obtained biaxially oriented laminated polyester film are shown in Table 2.

Example 19

An esterification reaction and a transesterification reaction among dimethyl terephthalate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-11) for film layer A having an intrinsic viscosity of 0.61 dL/g, having, as the acid component, 90% by mole of the terephthalic acid component and 10% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight on the basis of the weight of the obtained resin composition. This aromatic polyester (A-11) had a melting point of 226° C. and a glass transition temperature of 76° C. Also, an aromatic polyester (B-9) for film layer B was obtained in the same manner as in the foregoing (A-11), except for incorporating 0.15% by weight of silica particles having an average particle size of 0.3 μm and 0.1% by weight of silica particles having an average particle size of 0.1 μm. This aromatic polyester (B-9) had a melting point of 226° C. and a glass transition temperature of 76° C. The thus obtained aromatic polyesters (A-11) and (B-9) were respectively supplied into different extruders and laminated at 280° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 100° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 110° C. and then subjected to a heat set treatment at 200° C. for 5 seconds, thereby obtaining a biaxially oriented laminated polyester film having a thickness of 10 μm. Characteristics of the obtained biaxially oriented laminated polyester film are shown in Table 2.

Example 20

An esterification reaction and a transesterification reaction among dimethyl terephthalate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-12) for film layer A having an intrinsic viscosity of 0.61 dL/g, having, as the acid component, 15% by mole of the terephthalic acid component and 85% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight on the basis of the weight of the obtained resin composition. This aromatic polyester (A-12) had a melting point of 226° C. and a glass transition temperature of 74° C. Also, an aromatic polyester (B-10) for film layer B was obtained in the same manner as in the foregoing (A-12), except for incorporating 0.15% by weight of silica particles having an average particle size of 0.3 μm and 0.1% by weight of silica particles having an average particle size of 0.1 μm. This aromatic polyester (B-10) had a melting point of 226° C. and a glass transition temperature of 74° C. The thus obtained aromatic polyesters (A-12) and (B-10) were respectively supplied into different extruders and laminated at 280° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 100° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 110° C. and then subjected to a heat set treatment at 200° C. for 5 seconds, thereby obtaining a biaxially oriented laminated polyester film having a thickness of 10 μm. Characteristics of the obtained biaxially oriented laminated polyester film are shown in Table 2.

Example 21

An esterification reaction and a transesterification reaction between dimethyl terephthalate and ethylene glycol were carried out in the presence of titanium tetrabutoxide, and subsequently, a polycondensation reaction was carried out to obtain an aromatic polyester (A-13) for film layer A having an intrinsic viscosity of 0.61 dL/g, having, as the acid component, 100% by mole of the terephthalic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight on the basis of the weight of the obtained resin composition. This aromatic polyester (A-13) had a melting point of 254° C. and a glass transition temperature of 78° C. The thus obtained aromatic polyester (A-13) and (B-9) prepared in Example 11 were respectively supplied into different extruders and laminated at 280° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 100° C. and stretched in a draw ratio of 4.0 times in the longitudinal direction (machine direction), thereby obtaining a monoaxially oriented film. This monoaxially oriented film was guided into a stenter, stretched in a draw ratio of 5.0 times in the transverse direction (width direction) at 110° C. and then subjected to a heat set treatment at 200° C. for 5 seconds, thereby obtaining a biaxially oriented laminated polyester film having a thickness of 10 μm. Characteristics of the obtained biaxially oriented laminated polyester film are shown in Table 2.

Example 22

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-7) for film single layer having an intrinsic viscosity of 0.61 dL/g, having, as the acid component, 70% by mole of the 2,6-naphthalene dicarboxylic acid component and 30% by mole of the 4,4'-(ethylenedioxy) bisbenzoic acid component and having, as the glycol component, 98% by mole of the ethylene glycol component and 2% by mole of the diethylene glycol component. In this connection, prior to the polycondensation reaction, the aromatic polyester (A-7) was incorporated with silica particles having an average particle size of 0.3 μm in an amount of 0.15% by weight on the basis of the weight of the obtained resin composition. This aromatic polyester (A-7) had a melting point of 240° C. and a glass transition temperature of 100° C. A biaxially oriented polyester film was obtained by repeating the same operations as those in Example 9, except that the thus obtained aromatic polyester (A-7) was extruded in a molten state into a sheet form onto a rotating cooling drum at a temperature of 30° C. Characteristics of the obtained biaxially oriented polyester film are shown in Table 2.

Example 23

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A-8) for film single layer having an intrinsic viscosity of 0.61 dL/g, having, as the acid component, 70% by mole of the 2,6-naphthalene dicarboxylic acid component and 30% by mole of the 4,4'-(ethylenedioxy) bisbenzoic acid component and having, as the glycol component, 98% by mole of the ethylene glycol component and 2% by mole of the diethylene glycol component. In this connection, prior to the polycondensation reaction, the aromatic polyester (A-8) was incorporated with silica particles having an average particle size of 0.1 μm in an amount of 0.1% by weight on the basis of the weight of the obtained resin composition. This aromatic polyester (A-8) had a melting point of 240° C. and a glass transition temperature of 100° C. A biaxially oriented polyester film was obtained by repeating the same operations as those in Example 9, except that the thus obtained aromatic polyester (A-8) was extruded in a molten state into a sheet form onto a rotating cooling drum at a temperature of 30° C. Characteristics of the obtained biaxially oriented polyester film are shown in Table 2.

Comparative Example 5

An esterification reaction and a transesterification reaction between dimethyl 2,6-naphthalene dicarboxylate and ethylene glycol were carried out in the presence of titanium tetrabutoxide, and subsequently, a polycondensation reaction was carried out to obtain polyethylene-2,6-naphthalene dicarboxylate (A-9) for film layer A having an intrinsic viscosity of 0.62 dL/g and having, as the glycol component, 1.5% by mole of the diethylene glycol component. In this connection, prior to the polycondensation reaction, the polyethylene-2,6-naphthalene dicarboxylate (A-9) was incorporated with silica particles having an average particle size of 0.1 μm in an amount of 0.1% by weight on the basis of the weight of the obtained resin composition. Also, polyethylene-2,6-naphthalene dicarboxylate (B-7) for film layer B was obtained in the same manner as in the foregoing (A-9), except for changing the inert particles to 0.15% by weight of silica particles having an average particle size of 0.3 μm and 0.1% by weight of silica particles having an average particle size of 0.1 μm. Each of these polyethylene-2,6-naphthalene dicarboxylates (A-9) and (B-7) had a melting point of 270° C. and a glass transition temperature of 120° C. An unstretched laminated film was then formed in the same manner as in Example 9. The film was then heated by an IR heater from the upper portion between two pairs of rollers having a different rotating speed from each other along the machine direction such that the surface temperature of the film was 140° C. and stretched in a draw ratio of 3.0 times in the longitudinal direction (machine direction), thereby obtaining a monoaxially oriented film. This monoaxially oriented film was guided into a stenter, stretched in a draw ratio of 4.3 times in the transverse direction (width direction) at 140° C. and then subjected to a heat set treatment at 200° C. for 10 seconds, thereby obtaining a biaxially oriented laminated polyester film having a thickness of 5 μm. Characteristics of the obtained biaxially oriented laminated polyester film are shown in Table 2.

Comparative Example 6

A biaxially oriented laminated polyester film having a thickness of 5 μm was obtained by repeating the same operations as those in Comparative Example 5, except for changing the stretching temperature in the machine direction to 140° C., changing the draw ratio in the machine direction to 4.0 times, changing the stretching temperature in the width direction to 140° C., changing the draw ratio in the width direction to 4.0 times, changing the heat set treatment temperature to 200° C. and changing the thickness of the unstretched film, respectively. Characteristics of the obtained biaxially oriented laminated polyester film are shown in Table 2.

Comparative Example 7

A biaxially oriented laminated polyester film having a thickness of 5 μm was obtained by repeating the same operations as those in Comparative Example 5, except for changing the stretching temperature in the machine direction to 140° C., changing the draw ratio in the machine direction to 4.5 times, changing the stretching temperature in the width direction to 140° C., changing the draw ratio in the width direction to 3.4 times, changing the heat set treatment temperature to 200° C. and changing the thickness of the unstretched film, respectively. Characteristics of the obtained biaxially oriented laminated polyester film are shown in Table 2.

Example 24

A biaxially oriented polyester film was obtained by repeating the same operations as those in Example 11, except for extruding the polyester (A-11) prepared in Example 19 in a molten state into a sheet form onto a rotating cooling drum at a temperature of 30° C. to form an unstretched (single-layered) film and changing the draw ratio in the machine direction from 4.0 times to 3.0 times. Characteristics of the obtained biaxially oriented polyester film are shown in Table 2.

Comparative Example 8

An esterification reaction and a transesterification reaction between dimethyl terephthalate and ethylene glycol were carried out in the presence of titanium tetrabutoxide, and subsequently, a polycondensation reaction was carried out to obtain an aromatic polyester (B-11) for film layer B having an intrinsic viscosity of 0.61 dL/g, having, as the acid component, 100% by mole of the terephthalic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.1 μm in an amount of 0.1% by weight and 0.15% by weight of silica particles having an average particle size of 0.3 μm on the basis of the weight of the obtained resin composition. This aromatic polyester (B-11) had a melting point of 254° C. and a glass transition temperature of 78° C. The thus obtained polyester (B-11) and (A-13) prepared in Example 13 were respectively supplied into different extruders and laminated at 280° C. in a thickness ratio of 1/2 within a die, and the laminate was extruded in a molten state into a sheet form onto a rotating cooling drum at a temperature of 30° C., thereby forming an unstretched laminated film. The film was then heated by an IR heater from the upper portion between two pairs of rollers having a different rotating speed from each other along the machine direction such that the surface temperature of the film was 100° C. and stretched in a draw ratio of 3.0 times in the longitudinal direction (machine direction), thereby obtaining a monoaxially oriented film. This monoaxially oriented film was guided into a stenter, stretched in a draw ratio of 4.0 times in the transverse direction (width direction) at 110° C. and then subjected to a heat set treatment at 200° C. for 5 seconds, thereby obtaining a biaxially oriented laminated polyester film having a thickness of 10 μm. Characteristics of the obtained biaxially oriented laminated polyester film are shown in Table 2.

TABLE 2

| | Polyester composition | | | | Film thickness | | Film physical properties | | | | | | | Film characteristics | | | | |
|---|---|---|---|---|---|---|---|---|---|---|---|---|---|---|---|---|---|---|
| | Film layer A | | Film layer B | | Thickness ratio Layer B/Layer A | Rate Layer B/Whole layer % | | Whole layer μm | Young's modulus | | Humidity expansion coefficient ($\alpha h$) | | Temperature expansion coefficient ($\alpha t$) | | Surface roughness | | Winding properties | Electromagnetic conversion characteristics | Productivity of film |
| | Kind of composition | Proportion of EBA % by mole | Kind of composition | Proportion of EBA % by mole | | | MD GPa | TD GPa | MD % RH | TD % RH | MD ppm/°C. | TD ppm/°C. | B side nm | A side nm | | | | |
| Example 9 | A-1 | 30 | B-1 | 30 | 2/1 | 66.7 | 10 | 4.3 | 7.0 | 8.7 | 6.7 | 12.1 | −1.0 | 8 | 3 | Good | Fair | Good |
| Example 10 | A-2 | 30 | B-2 | 30 | 1/1 | 50.0 | 10 | 4.3 | 7.0 | 8.7 | 6.7 | 12.1 | −1.0 | 6 | 5 | Good | Fair | Fair |
| Example 11 | A-3 | 30 | B-3 | 30 | 4/1 | 80.0 | 10 | 4.3 | 7.0 | 8.7 | 6.7 | 12.1 | −1.0 | 7 | 2 | Fair | Good | Good |
| Example 12 | A-4 | 30 | B-4 | 30 | 2/1 | 66.7 | 10 | 4.3 | 7.0 | 8.7 | 6.7 | 12.1 | −1.0 | 8 | 4 | Good | Fair | Good |
| Example 13 | A-5 | 10 | B-5 | 10 | 2/1 | 66.7 | 10 | 4.8 | 7.5 | 9.5 | 7.6 | 10.7 | −1.8 | 8 | 4 | Good | Fair | Good |
| Example 14 | A-6 | 75 | B-6 | 75 | 2/1 | 66.7 | 10 | 4.0 | 6.3 | 6.9 | 5.9 | 13.6 | 3.1 | 8 | 4 | Good | Fair | Good |
| Example 15 | A-1 | 30 | B-1 | 30 | 1/2 | 33.3 | 10 | 4.3 | 7.0 | 8.7 | 6.7 | 12.1 | −1.0 | 8 | 3 | Good | Good | Bad |
| Example 16 | A-7 | 30 | B-1 | 30 | 2/1 | 66.7 | 10 | 4.7 | 7.8 | 11.0 | 8.0 | 10.6 | −1.8 | 8 | 3 | Good | Fair | Good |
| Example 17 | A-1 | 30 | B-7 | 30 | 1/2 | 33.3 | 10 | 4.7 | 7.8 | 11.0 | 8.0 | 10.6 | −1.8 | 8 | 3 | Good | Good | Bad |
| Example 18 | A-10 | 70 | B-8 | 70 | 2/1 | 66.7 | 10 | 4.0 | 6.2 | 11.4 | 5.2 | 16.6 | 4.2 | 8 | 4 | Good | Fair | Good |
| Example 19 | A-11 | 10 | B-9 | 10 | 2/1 | 66.7 | 10 | 4.4 | 7.5 | 10.0 | 6.5 | 14.1 | 7.9 | 8 | 4 | Good | Fair | Good |
| Example 20 | A-12 | 85 | B-10 | 85 | 2/1 | 66.7 | 10 | 4.7 | 6.1 | 8.0 | 5.2 | 24.1 | 5.6 | 8 | 4 | Good | Fair | Good |
| Example 21 | A-13 | 0 | B-9 | 10 | 2/1 | 66.7 | 10 | 3.9 | 7.4 | 12.1 | 6.7 | 15.3 | 8.7 | 8 | 4 | Good | Fair | Good |
| Example 22 | A-7 | 30 | — | — | Single layer | — | 10 | 4.3 | 7.0 | 8.7 | 6.7 | 12.1 | −1.0 | 8 | 8 | Good | Bad | Good |
| Example 23 | A-8 | 30 | — | — | Single layer | — | 10 | 4.3 | 7.0 | 8.7 | 6.7 | 12.1 | −1.0 | 2 | 2 | Bad | Good | Good |
| Comparative Example 5 | A-9 | 0 | B-7 | 0 | 2/1 | 66.7 | 5 | 5.5 | 9.5 | 13.5 | 8.6 | 14 | −3.8 | 8 | 4 | Good | Fair | Good |
| Comparative Example 6 | A-9 | 0 | B-7 | 0 | 2/1 | 66.7 | 5 | 7.1 | 7.3 | 11.5 | 10.5 | 7.1 | 4.5 | 8 | 4 | Good | Fair | Good |

TABLE 2-continued

| | Polyester composition | | | | Film thickness | | | Film physical properties | | | | | | | | | | Film characteristics | | |
|---|---|---|---|---|---|---|---|---|---|---|---|---|---|---|---|---|---|---|---|---|
| | Film layer A | | Film layer B | | Thickness ratio Layer | Rate Layer | | | | | Humidity expansion coefficient (αh) | | Temperature expansion coefficient (αt) | | Surface roughness | | Winding prop- erties | Electro- mag- netic conver- sion char- acter- istics | Pro- duc- tivity of film |
| | Kind of com- posi- tion | Pro- por- tion of EBA % by mole | Kind of com- posi- tion | Pro- por- tion of EBA % by mole | B/ Layer A | B/ Whole layer % | Whole layer μm | Young's modulus | | MD ppm/ % RH | TD ppm/ % RH | MD ppm/ °C. | TD ppm/ °C. | B side nm | A side nm | | | |
| | | | | | | | | MD GPa | TD GPa | | | | | | | | | |
| Com- par- ative Exam- ple 7 | A-9 | 0 | B-7 | 0 | 2/1 | 66.7 | 5 | 9.2 | 5.7 | 8.9 | 13.5 | −2.0 | 13.5 | 8 | 4 | Good | Fair | Good |
| Exam- ple 24 | A-11 | 10 | — | — | Single layer | — | 10 | 3.4 | 8.3 | 10.5 | 5.6 | 26.5 | 3.6 | 2 | 2 | Bad | Good | Good |
| Com- par- ative Exam- ple 8 | A-13 | 0 | B-11 | 0 | 2/1 | 66.7 | 5 | 4.2 | 6.5 | 14.4 | 8.3 | 25.9 | 8.8 | 8 | 4 | Good | Fair | Good |

In Table 2, each of A-1 to A-13 and B-1 to B-11 represents the kind of the aromatic polyester described in each of the Examples; the proportion of EBA represents % by mole of the 4,4'-(ethylenedioxy)bisbenzoic acid component in the whole acid component; MD represents the machine direction of the film; TD represents the width direction of the film; and the A side and the B side represent the surface of the side of the film layer A and the surface of the side of the film layer B of the biaxially oriented laminated polyester film, respectively.

Example 25

An esterification reaction and a transesterification reaction between dimethyl 2,6-naphthalene dicarboxylate and ethylene glycol were carried out in the presence of titanium tetrabutoxide, and subsequently, a polycondensation reaction was carried out to obtain polyethylene-2,6-naphthalene dicarboxylate (A'-1) for film layer (A') having, as the glycol component, 1.5% by mole of the diethylene glycol component. In this connection, prior to the polycondensation reaction, the polyethylene-2,6-naphthalene dicarboxylate (A'-1) was incorporated with silica particles having an average particle size of 0.3 μm in an amount of 0.3% by weight and 0.2% by weight of silica particles having an average particle size of 0.15 μm on the basis of the weight of the obtained resin composition.

Also, an esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (B'-1) for film layer (B') having, as the acid component, 73% by mole of the 2,6-naphthalene dicarboxylic acid component and 27% by mole of the 4,4'-(ethylenedioxy)bisbenzoic acid component and having, as the glycol component, 98% by mole of the ethylene glycol component and 2% by mole of the diethylene glycol component. This aromatic polyester (B'-1) had a melting point of 242° C. and a glass transition temperature of 102° C.

Each of the thus obtained aromatic polyester (A'-1) and (B'-1) was dried at 170° C. for 6 hours, supplied into an extruder and then heated to 295° C. to form a melt. After the polyester for layer of (A'-1) was allowed to diverge into 101 layers, and the polyester for layer of (B'-1) was allowed to diverge into 100 layers, the polyesters were guided into a die using a multi-layer feed block apparatus such that the layer of (A'-1) and the layer of (B'-1) were alternately laminated, while keeping the laminated state, and the laminate was extruded in a molten state into a sheet form onto a rotating cooling drum at a temperature of 50° C., thereby forming an unstretched multi-layer laminated film having the layer of (A'-1) and the layer of (B'-1) alternately laminated therein and composed of 201 layers in total. In this connection, a delivery ratio of the layer B' to the layer A' was 2/1. The film was then heated by an IR heater from the upper portion between two pairs of rollers having a different rotating speed from each other along the machine direction such that the surface temperature of the film was 135° C. and stretched in a draw ratio of 3.5 times in the longitudinal direction (machine direction), thereby obtaining a monoaxially oriented film. This monoaxially oriented film was guided into a stenter, stretched in a draw ratio of 6.0 times in the transverse direction (width direction) at 145° C. and then subjected to a heat set treatment at 190° C. for 5 seconds, thereby obtaining a biaxially oriented multi-layer laminated film having a thickness of 5 p.m.

Characteristics of the obtained biaxially oriented polyester film are shown in Table 3.

Example 26

A biaxially oriented multi-layer laminated film was obtained by repeating the same operations as those in Example 25, except for changing the delivery ratio of the layer B' to the layer A' to 1/1.

Characteristics of the obtained biaxially oriented polyester film are shown in Table 3.

Example 27

A biaxially oriented multi-layer laminated film was obtained by repeating the same operations as those in Example 25, except for changing the delivery ratio of the layer B' to the layer A' to 4/1.

Characteristics of the obtained biaxially oriented polyester film are shown in Table 3.

Example 28

A biaxially oriented multi-layer laminated film was obtained by repeating the same operations as those in Example 25, except for changing the layer number of the layer A' to 51 layers and changing the layer number of the layer B' to 50 layers, respectively, thereby changing the total layer number to 101 layers.

Characteristics of the obtained biaxially oriented polyester film are shown in Table 3.

Example 29

A biaxially oriented multi-layer laminated film was obtained by repeating the same operations as those in Example 25, except for changing the longitudinal draw ratio to 5.5 times and changing the lateral draw ratio to 5.3 times, respectively.

Characteristics of the obtained biaxially oriented polyester film are shown in Table 3.

Example 30

A biaxially oriented multi-layer laminated film was obtained by repeating the same operations as those in Example 25, except for changing the longitudinal draw ratio to 5.0 times and changing the lateral draw ratio to 7.5 times, respectively.

Characteristics of the obtained biaxially oriented polyester film are shown in Table 3.

Example 31

A biaxially oriented multi-layer laminated film was obtained by repeating the same operations as those in Example 25, except for changing the acid component of the aromatic polyester of the film layer B' so as to have 65% by mole of the 2,6-naphthalne dicarboxylic acid component and 35% by mole of the 4,4'-(ethylenedioxy)bisbenzoic acid component.

Characteristics of the obtained biaxially oriented polyester film are shown in Table 3.

Example 32

A biaxially oriented multi-layer laminated film was obtained by repeating the same operations as those in Example 25, except for changing the acid component of the aromatic polyester of the film layer B' so as to have 72% by mole of the 2,6-naphthalne dicarboxylic acid component and 18% by mole of the 4,4'-(ethylenedioxy)bisbenzoic acid component.

Characteristics of the obtained biaxially oriented polyester film are shown in Table 3.

Example 33

A biaxially oriented multi-layer laminated film was obtained by repeating the same operations as those in Example 25, except for changing the acid component of the aromatic polyester of the film layer A' so as to have 98% by mole of the 2,6-naphthalne dicarboxylic acid component and 2% by mole of the 4,4'-(ethylenedioxy)bisbenzoic acid component.

Characteristics of the obtained biaxially oriented polyester film are shown in Table 3.

Example 34

A biaxially oriented multi-layer laminated film was obtained by repeating the same operations as those in Example 25, except for changing the layer number of the layer A' to 25 layers and changing the layer number of the layer B' to 25 layers, respectively, thereby changing the total layer number to 50 layers.

Characteristics of the obtained biaxially oriented polyester film are shown in Table 3.

Example 35

A biaxially oriented multi-layer laminated film was obtained by repeating the same operations as those in Example 25, except for incorporating the silica particles into the side of the layer B' but not the side of the layer A'; and changing the layer number of the layer A' to 10 layers and changing the layer number of the layer B' to 11 layers (so as to dispose the layer B' on the both surfaces), respectively, thereby changing the total layer number to 21 layers.

Characteristics of the obtained biaxially oriented polyester film are shown in Table 3.

Example 36

An esterification reaction and a transesterification reaction between dimethyl terephthalate and ethylene glycol were carried out in the presence of titanium tetrabutoxide, and subsequently, a polycondensation reaction was carried out to obtain polyethylene terephthalate (A'-2) for film layer (A') having, as the glycol component, 1.5% by mole of the diethylene glycol component. In this connection, prior to the polycondensation reaction, the polyethylene terephthalate (A'-2) was incorporated with silica particles having an average particle size of 0.3 µm in an amount of 0.3% by weight and 0.2% by weight of silica particles having an average particle size of 0.15 µm on the basis of the weight of the obtained resin composition.

Also, an esterification reaction and a transesterification reaction among dimethyl terephthalate, 4,4'-(ethylenedioxy) bisbenzoic acid and ethylene glycol were carried out in the presence of titanium tetrabutoxide, and subsequently, a polycondensation reaction was carried out to obtain an aromatic polyester (B'-2) for film layer (B') having, as the acid component, 90% by mole of the terephthalic acid component and 10% by mole of the 4,4'-(ethylenedioxy)bisbenzoic acid component and having, as the glycol component, 98% by mole of the ethylene glycol component and 2% by mole of the diethylene glycol component. This aromatic polyester (B'-2) had a melting point of 226° C. and a glass transition temperature of 76° C.

Each of the thus obtained aromatic polyester (B'-2) for the layer B' and polyethylene terephthalate (A'-2) for the layer A' was dried at 170° C. for 3 hours, supplied into an extruder and then heated to 280° C. to form a melt. After the polyester for the layer A' was allowed to diverge into 101 layers, and the polyester for the layer B' was allowed to diverge into 100 layers, the polyesters were guided into a die using a multi-layer feed block apparatus such that the layer A' and the layer B' were alternately laminated, while keeping the laminated state, and the laminate was extruded in a molten state into a sheet form onto a rotating cooling drum at a temperature of 30° C., thereby forming an unstretched multi-layer laminated film having the layer A' and the layer B' alternately laminated therein and composed of 201 layers in total. In this connection, a delivery ratio of the layer B' to the layer A' was 2/1. The film was then heated by an IR heater from the upper portion between two pairs of rollers having a different rotating speed from each other along the machine direction such that the surface temperature of the film was 100° C. and stretched in a draw ratio of 3.5 times in the longitudinal direction (machine direction), thereby obtaining a monoaxially oriented film. This monoaxially oriented film was guided into a stenter, stretched in a draw ratio of 5.5 times in the transverse direction (width direction) at 110° C. and then subjected to a heat set treatment at 190° C. for 5 seconds, thereby obtaining a biaxially oriented multi-layer laminated film having a thickness of 5 μm.

Characteristics of the obtained biaxially oriented polyester film are shown in Table 3.

Example 37

A biaxially oriented multi-layer laminated film was obtained by repeating the same operations as those in Example 36, except for changing the layer number of the layer A' to 51 layers and changing the layer number of the layer B' to 50 layers, respectively, thereby changing the total layer number to 101 layers. Characteristics of the obtained biaxially oriented polyester film are shown in Table 3.

Example 38

A biaxially oriented multi-layer laminated film was obtained by repeating the same operations as those in Example 36, except for changing the acid component of the aromatic polyester of the film layer B' so as to have 30% by mole of the terephthalic acid component and 70% by mole of the 4,4'-(ethylenedioxy)bisbenzoic acid component. Characteristics of the obtained biaxially oriented polyester film are shown in Table 3.

Example 39

A biaxially oriented multi-layer laminated film was obtained by repeating the same operations as those in Example 36, except for changing the acid component of the aromatic polyester of the film layer B' so as to have 15% by mole of the terephthalic acid component and 85% by mole of the 4,4'-(ethylenedioxy)bisbenzoic acid component. Characteristics of the obtained biaxially oriented polyester film are shown in Table 3.

Example 40

A biaxially oriented multi-layer laminated film was obtained in the same manner as in Example 37, except for blending the aromatic polyester (A'-2) of the film layer A' with a polyether imide (GE's Ultem 1010 (glass transition temperature: 215° C.)) in an amount of 5% by weight on the basis of the weight of the film layer A'. Characteristics of the obtained biaxially oriented polyester film are shown in Table 3.

Example 41

An esterification reaction and a transesterification reaction among dimethyl 2,6-naphthalene dicarboxylate, 4,4'-(ethylenedioxy)bisbenzoic acid and ethylene glycol were carried out in the presence of titanium tetrabutoxide, and subsequently, a polycondensation reaction was carried out to obtain an aromatic polyester (A'-3) for film layer (A') having, as the acid component, 73% by mole of the 2,6-naphthalene dicarboxylic acid component and 27% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester was incorporated with silica particles having an average particle size of 0.3 μm in an amount of 0.3% by weight and 0.2% by weight of silica particles having an average particle size of 0.15 μm on the basis of the weight of the obtained resin composition. Then, a biaxially oriented multi-layer laminated film was obtained by repeating the same operations as those in Example 25, except for changing the aromatic polyester for the film layer A' to the aromatic polyester (A'-3), changing the longitudinal draw ratio to 5.8 times, changing the lateral draw ratio to 7.7 times and changing the lateral stretching temperature to 140° C., respectively.

Characteristics of the obtained biaxially oriented polyester film are shown in Table 3.

Example 42

A biaxially oriented polyester film was obtained by repeating the same operations as those in Example 25, except for changing the film to a single-layered film of the film layer B'.

Characteristics of the obtained biaxially oriented polyester film are shown in Table 3.

Comparative Example 9

An esterification reaction and a transesterification reaction between dimethyl 2,6-naphthalene dicarboxylate and ethylene glycol were carried out in the presence of titanium tetrabutoxide, and subsequently, a polycondensation reaction was carried out to obtain polyethylene-2,6-naphthalene dicarboxylate (B'-3) for film layer (B') having an intrinsic viscosity of 0.62 dL/g and having, as the glycol component, 1.5% by mole of the diethylene glycol component. Then, a biaxially oriented multi-layer laminated film was obtained by repeating the same operations as those in Example 25, except for changing the aromatic polyester for the film layer B' to the aromatic polyester (B'-3), changing the longitudinal draw ratio to 5.0 times, changing the lateral draw ratio to 6.4 times and changing the lateral stretching temperature to 150° C., respectively.

Characteristics of the obtained biaxially oriented polyester film are shown in Table 3.

Example 43

A biaxially oriented laminated polyester film was obtained by repeating the same operations as those in Example 25, except for changing the film to a two-layer laminated film composed of a single layer of the layer B' and a single layer of the layer A'.

Characteristics of the obtained biaxially oriented polyester film are shown in Table 3.

Example 44

An esterification reaction and a transesterification reaction among dimethyl terephthalate, 4,4'-(ethylenedioxy)bisbenzoic acid and ethylene glycol were carried out in the presence of titanium tetrabutoxide, and subsequently, a polycondensation reaction was carried out to obtain an aromatic polyester (A'-4) for film layer (A') having, as the acid component, 90% by mole of the terephthalic acid component and 10% by mole of the 4,4'-(ethylenedioxy)bisbenzoic acid component and having, as the glycol component, 98% by mole of the ethylene glycol component and 2% by mole of the diethylene glycol component. In this connection, prior to the polycondensation reaction, the aromatic polyester (A'-4) was incorporated with silica particles having an average particle size of 0.3 μm in an amount of 0.3% by weight and 0.2% by weight of silica particles having an average particle size of 0.15 μm on the basis of the weight of the obtained resin composition.

Each of the thus obtained aromatic polyester (A'-4) for the layer A' and the aromatic polyester (B'-2) for the layer B' was dried at 170° C. for 3 hours, supplied into an extruder and then heated to 280° C. to form a melt. After the polyester for the layer A' was allowed to diverge into 101 layers, and the polyester for the layer B' was allowed to diverge into 100 layers. Thereafter, the polyesters were guided into a die using a multi-layer feed block apparatus such that the layer A' and the layer B' were alternately laminated, while keeping the laminated state, and the laminate was extruded in a molten state into a sheet form onto a rotating cooling drum at a temperature of 30° C., thereby forming an unstretched multi-layer laminated film having the layer A' and the layer B' alternately laminated therein and composed of 201 layers in total. In this connection, a delivery ratio of the layer B' to the layer A' was 2/1. The film was then heated by an IR heater from the upper portion between two pairs of rollers having a different rotating speed from each other along the machine direction such that the surface temperature of the film was 100° C. and stretched in a draw ratio of 3.0 times in the longitudinal direction (machine direction), thereby obtaining a monoaxially oriented film. This monoaxially oriented film was guided into a stenter, stretched in a draw ratio of 6.0 times in the transverse direction (width direction) at 110° C. and then subjected to a heat set treatment at 190° C. for 5 seconds, thereby obtaining a biaxially oriented multi-layer laminated film having a thickness of 5 μm.

Characteristics of the obtained biaxially oriented polyester film are shown in Table 3.

Example 45

A biaxially oriented polyester film was obtained by repeating the same operations as those in Example 44, except for changing the film to a single-layered film of the film layer B'.

Characteristics of the obtained biaxially oriented polyester film are shown in Table 3.

Comparative Example 10

An esterification reaction and a transesterification reaction between dimethyl terephthalate and ethylene glycol were carried out in the presence of titanium tetrabutoxide, and subsequently, a polycondensation reaction was carried out to obtain polyethylene terephthalate (B'-4) for film layer (B') having an intrinsic viscosity of 0.62 dL/g and having, as the glycol component, 1.5% by mole of the diethylene glycol component. Then, a biaxially oriented multi-layer laminated film was obtained by repeating the same operations as those in Example 44, except for changing the aromatic polyester for the film layer A' from (A'-4) to (A'-2), changing the aromatic polyester for the film layer B' to the aromatic polyester (B'-4), changing the longitudinal draw ratio to 3.5 times and changing the lateral draw ratio to 5.5 times, respectively.

Characteristics of the obtained biaxially oriented polyester film are shown in Table 3.

Example 46

A biaxially oriented laminated polyester film was obtained by repeating the same operations as those in Example 44, except for changing the aromatic polyester for the film layer A' from (A'-4) to (A'-2) and changing the film to a two-layer laminated film composed of a single layer of the layer B' and a single layer of the layer A'.

Characteristics of the obtained biaxially oriented polyester film are shown in Table 3.

TABLE 3

| | Film layer B | | | | Film layer A | | | | Thickness | Film thickness Rate | |
|---|---|---|---|---|---|---|---|---|---|---|---|
| | Proportion of EBA % by mole | Layer number Layers | Tg ° C. | Tm ° C. | Proportion of EBA % by mole | Layer number Layers | Tg ° C. | Tm ° C. | ratio (Layer B/ Layer A) —/— | (Layer B/ Whole layer) % | Total layer number Layers |
| Example 25 | 27 | 100 | 102 | 242 | 0 | 101 | 120 | 270 | 2/1 | 67 | 201 |
| Example 26 | 27 | 100 | 102 | 242 | 0 | 101 | 120 | 270 | 1/1 | 50 | 201 |
| Example 27 | 27 | 100 | 102 | 242 | 0 | 101 | 120 | 270 | 4/1 | 80 | 201 |
| Example 28 | 27 | 50 | 102 | 242 | 0 | 51 | 120 | 270 | 2/1 | 67 | 101 |
| Example 29 | 27 | 100 | 102 | 242 | 0 | 101 | 120 | 270 | 2/1 | 67 | 201 |
| Example 30 | 27 | 100 | 102 | 242 | 0 | 101 | 120 | 270 | 2/1 | 67 | 201 |
| Example 31 | 35 | 100 | 98 | 237 | 0 | 101 | 120 | 270 | 2/1 | 67 | 201 |
| Example 32 | 18 | 100 | 108 | 250 | 0 | 101 | 120 | 270 | 2/1 | 67 | 201 |
| Example 33 | 27 | 100 | 102 | 242 | 2 | 101 | 120 | 265 | 2/1 | 67 | 201 |
| Example 34 | 27 | 25 | 102 | 242 | 0 | 25 | 120 | 270 | 2/1 | 67 | 50 |
| Example 35 | 27 | 11 | 102 | 242 | 0 | 10 | 120 | 270 | 2/1 | 67 | 21 |
| Example 36 | 10 | 100 | 76 | 226 | 0 | 101 | 74 | 256 | 2/1 | 67 | 201 |
| Example 37 | 10 | 50 | 76 | 226 | 0 | 51 | 74 | 256 | 2/1 | 67 | 101 |
| Example 38 | 70 | 100 | 73 | 200 | 0 | 101 | 74 | 256 | 2/1 | 67 | 201 |
| Example 39 | 85 | 100 | 74 | 226 | 0 | 101 | 74 | 256 | 2/1 | 67 | 201 |
| Example 40 | 10 | 50 | 76 | 226 | 0 | 51 | 80 | 256 | 2/1 | 67 | 101 |
| Example 41 | 27 | 100 | 102 | 242 | 27 | 101 | 102 | 242 | 2/1 | 67 | 201 |
| Example 42 | 27 | — | 102 | 242 | Single layer | | | | — | — | — |
| Comparative Example 9 | 0 | 100 | 120 | 270 | 0 | 101 | 120 | 270 | 2/1 | 67 | 201 |

TABLE 3-continued

| | | | | | | | | | | | |
|---|---|---|---|---|---|---|---|---|---|---|---|
| Example 43 | 27 | 1 | 102 | 242 | 0 | 1 | 120 | 270 | 2/1 | 67 | 2 |
| Example 44 | 10 | 100 | 76 | 226 | 10 | 101 | 76 | 226 | 2/1 | 67 | 201 |
| Example 45 | 10 | — | 76 | 226 | | Single layer | | | — | — | — |
| Comparative Example 10 | 0 | 100 | 74 | 256 | 0 | 101 | 74 | 256 | 2/1 | 67 | 201 |
| Example 46 | 10 | 1 | 76 | 226 | 0 | 1 | 74 | 256 | 2/1 | 67 | 2 |

| | Film physical properties | | | | | | | | |
|---|---|---|---|---|---|---|---|---|---|
| | Film Thickness Whole layer | Young's modulus | | Temperature expansion coefficient ($\alpha t$) | | Humidity expansion coefficient ($\alpha t$) | | tan δ Peak temperature | Coating unuiniformity | Curl |
| | | GPa | GPa | (ppm/°C.) | | (ppm/% RH) | | | | |
| | μm | MD | TD | MD | TD | MD | TD | °C. | — | — |
| Example 25 | 5.0 | 3.7 | 7.5 | 17.5 | −2.0 | 12.0 | 5.7 | 133 | Good | Good |
| Example 26 | 5.0 | 3.7 | 7.6 | 18.1 | −0.6 | 13.2 | 6.4 | 133 | Good | Good |
| Example 27 | 5.0 | 3.6 | 7.6 | 19.9 | −2.1 | 11.0 | 5.4 | 133 | Fair | Good |
| Example 28 | 5.0 | 3.7 | 7.4 | 17.6 | −1.8 | 12.0 | 5.8 | 133 | Good | Good |
| Example 29 | 5.0 | 5.3 | 5.6 | 13.4 | 1.2 | 10.1 | 7.8 | 136 | Good | Good |
| Example 30 | 5.0 | 3.0 | 8.1 | 20.4 | −3.4 | 13.0 | 5.1 | 130 | Good | Good |
| Example 31 | 5.0 | 3.7 | 7.5 | 20.9 | −0.9 | 10.8 | 5.2 | 133 | Good | Good |
| Example 32 | 5.0 | 3.7 | 7.5 | 17.3 | −2.2 | 12.5 | 6.5 | 133 | Good | Good |
| Example 33 | 5.0 | 3.7 | 7.5 | 16.9 | −2.1 | 11.8 | 5.5 | 133 | Good | Good |
| Example 34 | 5.0 | 3.7 | 7.5 | 17.0 | −2.3 | 12.0 | 5.7 | 133 | Good | Good |
| Example 35 | 5.0 | 3.7 | 7.5 | 16.9 | −2.3 | 12.0 | 5.7 | 133 | Good | Good |
| Example 36 | 5.0 | 4.0 | 7.0 | 33.8 | 7.9 | 14.0 | 7.1 | 100 | Fair | Good |
| Example 37 | 5.0 | 4.0 | 6.9 | 33.1 | 7.8 | 14.0 | 7.1 | 100 | Fair | Good |
| Example 38 | 5.0 | 3.9 | 6.2 | 50.0 | 5.0 | 12.7 | 5.2 | 95 | Fair | Good |
| Example 39 | 5.0 | 3.7 | 6.0 | 48.3 | 7.6 | 11.5 | 5.5 | 95 | Fair | Good |
| Example 40 | 5.0 | 4.0 | 7.0 | 35.3 | 7.7 | 14.0 | 7.0 | 120 | Good | Good |
| Example 41 | 5.0 | 3.5 | 8.0 | 24.1 | 3.2 | 10.1 | 4.9 | 90 | Bad | Good |
| Example 42 | 5.0 | 3.5 | 8.0 | 22.9 | 3.2 | 10.1 | 4.9 | 90 | Bad | Good |
| Comparative Example 9 | 5.0 | 5.5 | 9.5 | 15.2 | 0.8 | 13.5 | 8.6 | 155 | Good | Good |
| Example 43 | 5.0 | 3.2 | 6.6 | 21.3 | 1.7 | 12.7 | 8.0 | 147 | Good | Bad |
| Example 44 | 5.0 | 3.5 | 8.3 | 53.1 | 7.1 | 10.0 | 5.6 | 90 | Bad | Good |
| Example 45 | 5.0 | 3.4 | 8.3 | 46.7 | 7.1 | 10.5 | 5.6 | 90 | Bad | Good |
| Comparative Example 10 | 5.0 | 4.2 | 6.5 | 26.0 | 6.0 | 14.4 | 8.3 | 100 | Fair | Good |
| Example 46 | 5.0 | 3.9 | 7.4 | 28.9 | 8.1 | 12.1 | 8.0 | 100 | Fair | Bad |

In Table 3, the proportion of EBA represents a proportion of the 4,4'-(ethylenedioxy)bisbenzoic acid component on the basis of the molar number of the whole of the acid components; Tg represents a glass transition temperature; Tm represents a melting point; MD represents the machine direction; and TD represents the width direction.

EFFECT OF THE INVENTION

According to the aromatic polyester of the present invention, the film forming properties can be highly increased while keeping excellent characteristics of the 4,4'-(alkylenedioxy)bisbenzoic acid component. As a result, a biaxially oriented polyester film with excellent dimensional stability as compared with conventional polyesters can be obtained.

In consequence, according to the present invention, a film which is suitable for applications in which high dimensional stability taking into account influences by the humidity and temperature is required, in particular, a base film of a high-density magnetic recording medium. Then, by using the film of the present invention, a high-density magnetic recording medium with excellent dimensional stability and the like can also be provided.

Also, according to the present invention, a biaxially oriented laminated polyester film which is easy to make both flatness and winding properties compatible with each other on high levels is obtained.

Moreover, according to the present invention, a biaxially oriented multi-layer laminated film with excellent film forming properties such as stretching is further provided.

INDUSTRIAL APPLICABILITY

The copolymerized aromatic polyester of the present invention and the biaxially oriented polyester film obtained therefrom have excellent dimensional stability which could not be achieved by the conventional polyethylene terephthalate, polyethylene-2,6-naphthalate or polyalkylene-6,6'-(alkylenedioxy)di-2-naphthoate, and can be suitably used for applications in which the dimensional stability is required, in particular, a base film of a high-density magnetic recording medium.

Furthermore, in addition to the foregoing dimensional stability, the biaxially oriented laminated polyester film of the present invention is easy to make both flatness and winding properties compatible with each other on high levels, and therefore, it can be suitably used especially as a base film of a high-density magnetic recording medium.

Moreover, the biaxially oriented multi-layer laminated film of the invention has excellent dimensional stability, hardly generates elongation at the time of processing and is suppressed in curl. Therefore, the biaxially oriented multi-layer laminated film of the present invention can be utilized for various applications, and in particular, it can be suitably utilized as a support of a high-density magnetic recording medium.

What is claimed is:

1. A copolymerized aromatic polyester comprising aromatic dicarboxylic acid components represented by the following formulae (I) and (II) and a glycol component represented by the following formula (III), wherein
a 4,4'-(alkylenedioxy)bisbenzoic acid component represented by the formula (I) is contained in an amount of 5% by mole or more and less than 90% by mole on the basis of a molar number of a wholly aromatic dicarboxylic acid component constituting the copolymerized aromatic polyester:

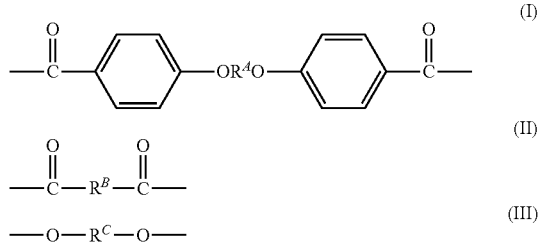

wherein $R^A$ represents an alkylene group having 1 to 10 carbon atoms; $R^B$ represents a phenylene group or a naphthalenediyl group; and $R^C$ represents an alkylene group having 2 to 4 carbon atoms or a cycloalkylene group having 8 to 10 carbon atoms.

2. The copolymerized aromatic polyester according to claim 1, wherein the 4,4'-(alkylenedioxy)bisbenzoic acid component is a 4,4'-(ethylenedioxy)bisbenzoic acid component.

3. The copolymerized aromatic polyester according to claim 1, wherein the aromatic dicarboxylic acid component represented by the formula (II) is a terephthalic acid component or a 2,6-naphthalene dicarboxylic acid component.

4. The copolymerized aromatic polyester according to claim 1, wherein the glycol component represented by the formula (III) is an ethylene glycol component.

5. A biaxially oriented polyester film comprising the copolymerized aromatic polyester according to claim 1.

6. The biaxially oriented polyester film according to claim 5, wherein at least one layer is composed of the copolymerized aromatic polyester.

7. The biaxially oriented polyester film according to claim 6, which is a laminated film having a film layer B laminated on one surface of a film layer A, wherein a surface roughness (RaB) on the side of the film layer B of the laminated film is larger by 1.0 nm or more than a surface roughness (RaA) on the side of the film layer A.

8. The biaxially oriented polyester film according to claim 7, wherein the surface roughness (RaA) on the side of the film layer A is 1.0 to 7.0 nm, and the surface roughness (RaB) on the side of the film layer B is 5.0 to 15.0 nm.

9. The biaxially oriented polyester film according to claim 7 or 8, wherein the film layer B has a thickness of 50 to 90% relative to the thickness of the whole of the laminated film and is composed of the copolymerized aromatic polyester.

10. The biaxially oriented polyester film according to claim 7 or 8, wherein the film layer A has a thickness of 50 to 97% relative to the thickness of the whole of the laminated film and is composed of the copolymerized aromatic polyester.

11. The biaxially oriented polyester film according to claim 7, wherein both of the film layers A and B are composed of the copolymerized aromatic polyester.

12. The biaxially oriented polyester film according to claim 6, which is a biaxially oriented multi-layer laminated film having five or more layers of each of a film layer (A') and a film layer (B'), wherein
the film layer (B') is composed of an aromatic polyester (B') having a recurring unit (I') represented by the following formula (I') and a recurring unit (II') represented by the following formula (II') in amounts of 5% by mole or more and less than 80% by mole and more than 20% by mole and not more than 95% by mole, respectively on the basis of a molar number of the recurring units; and
the film layer (A') is composed of an aromatic polyester (A') having more than 95% by mole of the recurring unit represented by the following formula (II'):

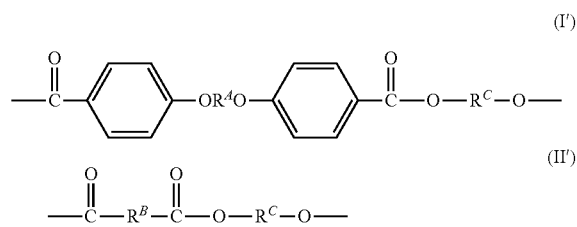

wherein $R^A$ represents an alkylene group having 1 to 10 carbon atoms; $R^B$ represents a phenylene group or a naphthalenediyl group; and $R^C$ represents an alkylene group having 2 to 4 carbon atoms or a cycloalkylene group having 8 to 10 carbon atoms.

13. The biaxially oriented polyester film according to claim 12, wherein a total thickness of the film layer (B') is 30 to 80% relative to the thickness of the multi-layer laminated film.

14. The biaxially oriented polyester film according to claim 12, wherein a proportion of the recurring unit (I') is 3 to 40% by mole on the basis of a molar number of the recurring units occupying in the whole of the multi-layer laminated film of the film layers (A') and (B') in total.

15. The biaxially oriented polyester film according to claim 12, wherein the recurring unit (II') is ethylene-2,6-naphthalene dicarboxylate or ethylene terephthalate.

16. The biaxially oriented polyester film according to any one of claims 5, 6, 7 and 12, wherein a Young's modulus in at least one direction of the film plane direction is 4.5 GPa or more.

17. The biaxially oriented polyester film according to any one of claims 5, 6, 7 and 12, wherein a humidity expansion coefficient in at least one direction of the film plane direction is 1 to 7 (ppm/% RH).

18. The biaxially oriented polyester film according to any one of claims 5, 6, 7 and 12, wherein the biaxially oriented polyester film is used as a base film of a magnetic recording medium.

19. A magnetic recording medium comprising the biaxially oriented polyester film according to any one of claims 5, 6, 7 and 12 and a magnetic layer formed on one surface thereof.

* * * * *